(12) United States Patent
Xie

(10) Patent No.: US 7,320,392 B2
(45) Date of Patent: Jan. 22, 2008

(54) SHAFT COUPLING UNIT

(76) Inventor: Xingyun Xie, 1 Floor West 72 Building, Tong Zi Po, River West, Changsha City (CN) 410013

( * ) Notice: Subject to any disclaimer, the term of this patent is extended or adjusted under 35 U.S.C. 154(b) by 116 days.

(21) Appl. No.: 10/535,022

(22) PCT Filed: Nov. 10, 2003

(86) PCT No.: PCT/CN03/00945

§ 371 (c)(1),
(2), (4) Date: May 13, 2005

(87) PCT Pub. No.: WO2004/046576

PCT Pub. Date: Jun. 3, 2004

(65) Prior Publication Data

US 2006/0049020 A1    Mar. 9, 2006

(30) Foreign Application Priority Data

Nov. 16, 2002 (CN) .............................. 02 1 50200

(51) Int. Cl.
*F16D 13/56* (2006.01)
*F16D 19/00* (2006.01)
(52) U.S. Cl. ............... 192/89.21; 188/166; 192/114 R
(58) Field of Classification Search ................... 188/68, 188/71.2; 192/53.1, 53.5
See application file for complete search history.

(56) References Cited

U.S. PATENT DOCUMENTS

| | | | |
|---|---|---|---|
| 2,783,861 A | 3/1957 | Jungles et al. | |
| 2,838,150 A | 6/1958 | Eason et al. | |
| 3,872,954 A * | 3/1975 | Nordstrom et al. | 192/18 A |
| 3,994,376 A | 11/1976 | Fulghum | |
| 4,567,965 A * | 2/1986 | Woodruff | 188/68 |
| 6,374,963 B1 * | 4/2002 | Xie | 188/166 |
| 6,508,336 B1 * | 1/2003 | El-Kassouf | 192/18 R |
| 6,588,552 B2 | 7/2003 | Xie | |
| 2002/0033308 A1 * | 3/2002 | Xie | 188/166 |

FOREIGN PATENT DOCUMENTS

| | | |
|---|---|---|
| CN | 1397743 A | 2/2003 |
| WO | WO96/01380 | 1/1996 |

* cited by examiner

*Primary Examiner*—Rodney H. Bonck
(74) *Attorney, Agent, or Firm*—Perkins Coie LLP

(57) ABSTRACT

A shaft coupling unit is disclosed, which comprises a coupling disk (1), a disk (2), a spring (3), a concave member (4), a convex member (5) and a draw lever (14). The concave member (4) is press fitted against the convex member to rotate circumferentially and to move axially with respect to one another. The concave member (4) is axially press fitted against the disk (2) to rotate circumferentially with respect to one another. An external coupling member (6) is disposed between the concave member (4) and a transmission member (7). The external coupling member (6) is radially press fitted against the concave member (4) to axially slide each other. The convex member (5) is mounted on the coupling disk (1). The spring (3joined to the disk (2) at an end, and joined to the draw lever (14) at the other end. The draw lever (14) is linked up with t coupling member (1) through the disk (2). The coupling disk (1) is mounted on an external transmission shaft (8), or at the latter through a shaft joining member (9) so as to form the shaft coupling unit of the invention for coupling the transmission member (7) with the external transmission shaft (8).

19 Claims, 20 Drawing Sheets

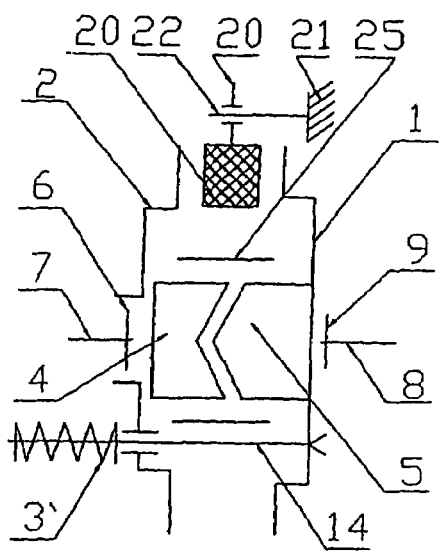 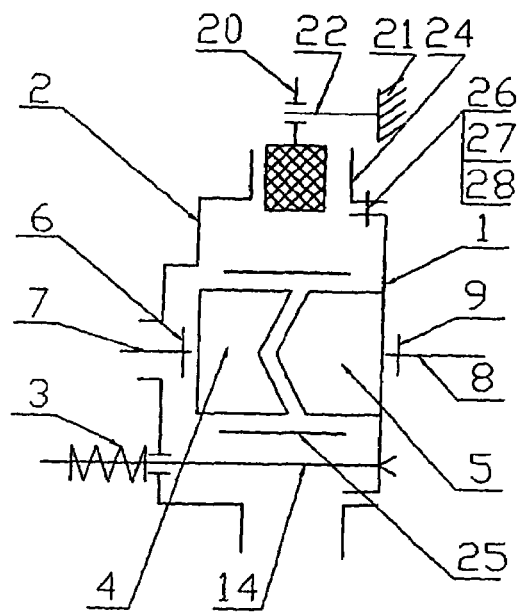
Fig.9　　　　　　　Fig.10
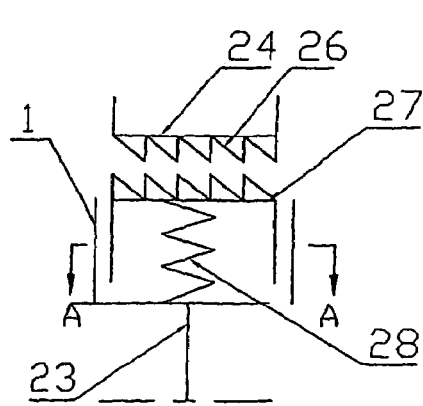 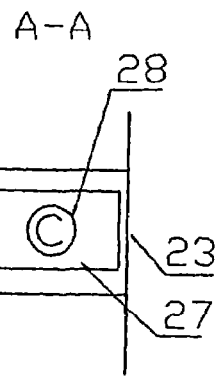 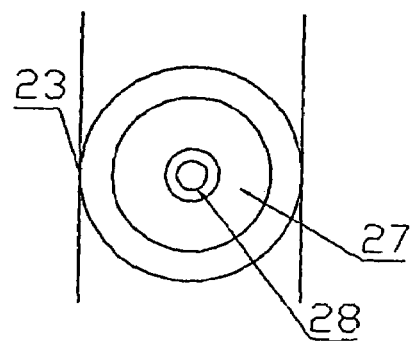
Fig.11　　　Fig.12　　　Fig.13

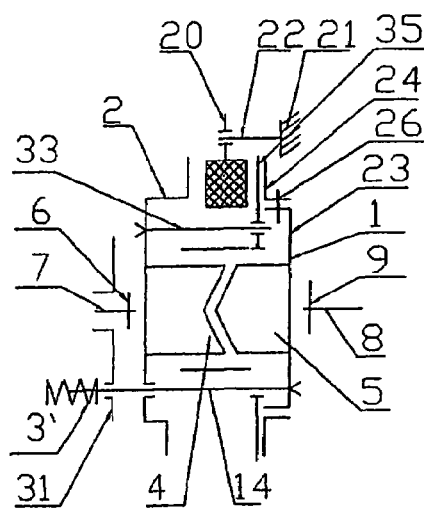
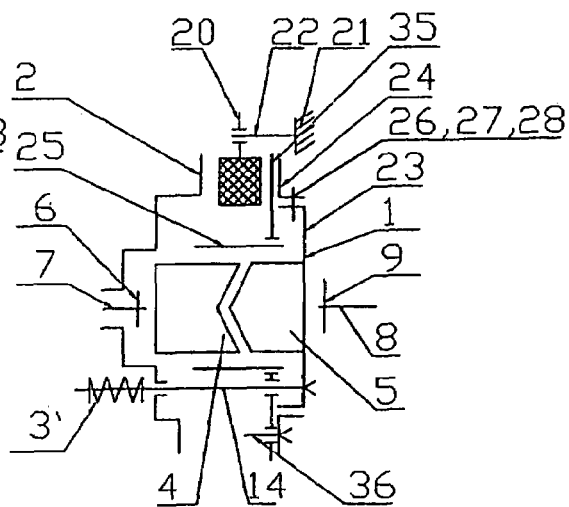
Fig.18  Fig.19
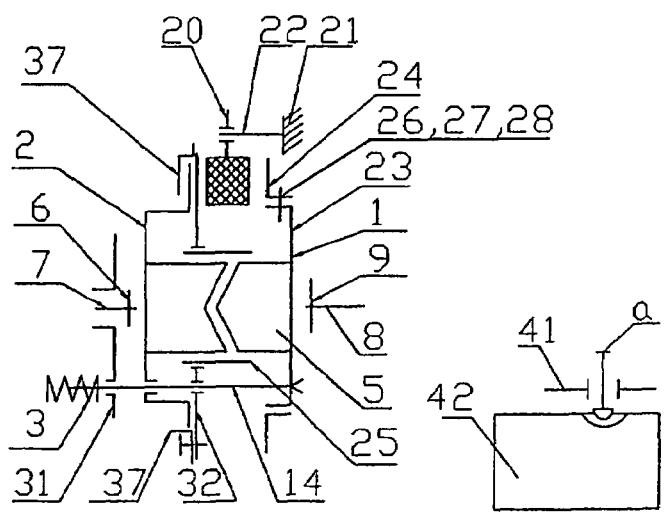
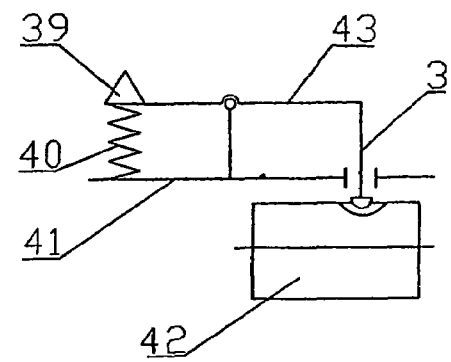
Fig.20  Fig.21  Fig.22

SHAFT COUPLING UNIT

CROSS-REFERENCE TO RELATED APPLICATION

This is the national stage of PCT/CN03/00945, filed Nov. 10, 2003.

This application claims the benefit of Chinese Patent Application No. 02150200.5 filed on Nov. 16, 2002 in the State Intellectual Property Office of China, the disclosure of which is incorporated herein by reference.

BACKGROUND OF THE INVENTION

1. Field of the Invention

The present invention relates to a shaft coupling device used for a movable object which rotates about a shaft, more particularly, to a shaft coupling device used for a mechanically shaft coupling device, a mechanically coupling clutch device or a mechanically coupling brake device for a shaft.

2. Description of the Related Art

U.S. Pat. No. 2,783,861 (Robert N. Jungles et al.) published on Mar. 5, 1957 disclosed a driven-released brake. In the technical scheme disclosed in the above publication, a movable member and a static member are constantly kept in a friction engagement state in which the movable member engages with the static member during force transmission process. Therefore, the driven-released brake of the above invention is problematic in that the brake is likely to be heated during transmission. As a result, power consumption of the brake is increased.

U.S. Pat. No. 2,838,150 (Clarance M. Eason et al.) published on Jun. 10, 1958 disclosed a compressed air operated clutch and mechanically connected brake. In the technical scheme disclosed in the above publication, a movable member and a static member are kept in an engagement state in which the movable member engages with the static member during transmission process when the clutch is driven to be in an engagement state by compressed air. When the clutch is kept in a released state, force generated by a driving member is necessitated so as to achieve a braking function.

U.S. Pat. No. 3,994,376 (David A. Fuighum et al.) published on Nov. 30, 1976 disclosed a self-actuating mechanism for braking a driven member upon discontinuating of drive thereto. In the technical scheme disclosed in the above publication, force is required to be applied to a driven member from a driving member when rotational movement is needed to be stopped.

PCT Publication WO96/01380 (application No. PCT/CN95/00055) published on Jan. 18, 1996 discloses a constant closed brake. The brake is provided with a brake spring which is provided on a brake disk and a coupling disk. A connection member associated with an external force association member is provided on a member which is associated with an engageable concave-convex surface associated with a convex/concave surface of the brake disk. The concave-convex surface is separated from the brake disk, and the brake disk is associated with the external force association member through engagement between the brake disk and the concave-convex surface. Therefore, the brake disclosed in this application is complicatedly constructed. The position of the compensation block of the friction gap adjustment and compensation device is not confined along the circumference direction. When the force applied by the external connection member is greater than the braking spring force, the brake disk disconnects from the friction block. On the other hand, the brake disk engages with the friction block as long as the force applied by the external connection member is less than the braking spring force. No device is provided to ensure the coupling device to be in a disconnected state when the brake disk disconnects from the friction block. Further, the coupling device is not provided with an overload protection device during transmission. Moreover, the gap adjustment and compensation device is not sufficiently limited to its position. In other types of constant closed brake, such as an electromagnetic brake, an electromagnet used as a force generating source is kept in a turn-on state during which the brake disk disconnects from the friction block.

SUMMARY

Embodiments of the present invention has been made to overcome the above mentioned disadvantages.

Accordingly, at least some embodiments provide an improved coupling device for a shaft with simpler structure, enhanced transmission efficiency, reduced energy consumption and decreased electrical controllers.

At least some embodiments provide a coupling device with reliable transmission operation.

At least some embodiments provide a coupling device with reliable transmission and clutch operation.

At least some embodiments provide a coupling device with reliable transmission and brake operation.

At least some embodiments provide a brake with a mechanically operated gap adjustment and compensation device for a shaft with which the brake is easily and conveniently adjusted and operation reliability is improved.

At least some embodiments provide a brake or coupling with a mechanically release-ensuring-keeping-device for a shaft in which an elastic transmission is shifted into a rigid transmission or a rigid transmission is eliminated while an elastic transmission is restored during transmission between an external force member and an out-extending shaft.

At least some embodiments provide a coupling device with an overload protection device for a shaft by a mechanical friction transmission operation.

At least some embodiments provide a coupling device for a shaft in which a movable coupling ring and a static coupling ring are kept disconnected and the engagement between the movable coupling device and the static coupling device can be controlled.

At least some embodiments provide a coupling clutch device for a shaft in which a movable coupling ring and a static coupling ring are kept disconnected and the engagement between the movable coupling device and the static coupling device can be controlled.

At least some embodiments provide a coupling brake device for a shaft in which a brake ring and a friction block are kept disconnected and the engagement between the brake ring and the friction block can be controlled.

An aspect of at least some of the foregoing embodiments can be achieved by providing a coupling device for a shaft comprising a coupling disk, a disk, a force generating source member, first and second concave-convex assemblies, wherein the first and second concave-convex assemblies are configured to be a press engagement arrangement in which rotational angular displacement and axial displacement relative to each other are operable. The first concave-convex assembly and the disk are configured to be an axial press engagement arrangement in which rotational sliding angular displacement relative to each other is operable. An external force association member is provided between the first concave-convex assembly and the external force member.

The external force association member and the first concave-convex assembly are configured to be a radial press engagement arrangement in which axial sliding displacement relative to each other is operable. The second concave-convex assembly is mounted on the coupling disk, and two ends of the external force member are connected with the coupling disk and the disk. The disk is mounted to the out-extending shaft through the coupling disk upon operation of the force generating source member or connected to the out-extending shaft through a shaft coupling member so as to form a coupling device by which the external force member is connected to the out-extending shaft.

Preferably, the coupling device for a shaft further includes: a friction block provided between the coupling disk and the coupling disk; and a retaining member which is coupled with the friction block, wherein: friction surfaces respectively extending from the coupling disk and the disk engage with the friction block.

Preferably, the friction surfaces include an inner disk body and an outer friction ring, wherein:

the inner disk body and the outer friction ring are provided therein with an outer threaded block, a compensation spring and a key pin.

Preferably, the first and second concave-convex assemblies are supported on a left end plate and a right end plate of the retaining member through bearings, respectively.

Preferably, the second concave-convex assembly is provided with an inner brake ring.

Preferably, the first and second concave-convex assemblies are provided with an insert rod and insert slot which correspond to each other so as to be locked with each other, and the insert rod is mounted inside an outer threaded sleeve of a release-ensuring frame; one end of a release-ensuring spring is connected with a plug of the insert rod, and the other end of the release-ensuring spring is connected with a cap; inner threads of the cap are connected with the outer threaded sleeve, and the insert rod passes through a hole of the cap so as to be connected with a centrifugal cap.

Preferably, the coupling disk is assembled to the out-extending shaft through a shaft coupling member.

Preferably, the first concave-convex assembly and the external force association member are configured to be engaged with each other through an outer spline and an inner spline.

Preferably, the force generating source member comprises a press spring.

Preferably, a friction member is provided between the first concave-convex assembly and the external force association member; and the friction member engages with the first concave-convex assembly and the external force association member, respectively.

Preferably, the friction transmission member is provided between the first concave-convex assembly and the friction member; and the friction transmission member engages with the first concave-convex assembly and the friction member respectively.

Preferably, the first and second concave-convex assemblies include engaging surfaces of right-handed helicoids which are engaged with each other.

Preferably, the disk includes a release-ensuring frame projected from therefrom; the first concave-convex assembly includes a cylindrical sleeve which is fitted over thereon; and a locking member is fixedly engaged with the release-ensuring frame and the cylindrical sleeve so that relative rotational movement between the first and second concave-convex assemblies is locked.

Preferably, the first concave-convex assembly is provided with an inner spline so as to engage with an outer spline provided on the second concave-convex assembly.

Preferably, the outer friction ring engages with a right friction ring through the key pin, and the right friction ring is associated with the friction ring.

Preferably, a pull rod is mounted on the coupling disk and passes through a circular hole of the disk so as to be associated with the disk.

Preferably, the press spring is fitted over the pull rod, wherein: one end of the press spring is pressed against and mounted on the disk, and the other end of the press spring is mounted on the pull rod.

Preferably, the retaining member is mounted on a relatively movable object so as to achieve a coupling clutch function.

Preferably, the retaining member is mounted on a relatively static object so as to achieve a coupling brake function.

BRIEF DESCRIPTION OF THE DRAWINGS

The above and other objects and advantages of the invention will become apparent and readily appreciated from the following description of the preferred embodiments, taken in conjunction with the accompanying drawings, in which FIGS. 1-26 are schematic views of the coupling device of the present invention for explaining the principal structure of the present invention. Thereafter, the coupling device of the present invention is described with reference to structural drawings of the specific embodiments. The same components are designated by the same reference numerals in which:

1 coupling disk; 2 disk; 3 force generating source member; 4, 5 first and second concave-convex assemblies; 6 external force connection member; 7 external force member; 8 out-extending shaft; 9 external force transition member; 10, 11 press force connection member; 12, 13 bearings; 14 pull rod; 15 inner spline; 16 outer spline; 17 limiting pin; 18 friction engagement member; 19 transmission friction member; 20 friction block; 21 retaining member; 22 support member; 23 inner disk body; 24 outer friction ring; 25 thin wall sleeve; 26 inner threaded ring; 27 outer threaded block; 28 compensation spring; 29 adjustment spring; 30 adjustment screw; 31 press plate; 32 left friction ring; 33 right friction ring; 34 inner support pin; 35 side friction ring; 36 key pin; 37 release member; 38 insert rod; 39 centrifugal member; 40 release-ensuring spring; 41 release-ensuring frame; 42 confronting member; 43 lever; 44 centrifugal cap; 45 cap; 46 front insert rod; 47 association pin; 48 rear insert rod; 49 connection rod; 50 left shaft transition member; 51 right shaft transition member; 52 bearing; 53 inner friction member; 54 left end plate; 55 spring force adjustment member; 56 right end plate; 57 right end cover; 58 gap adjustment member; 59 tightening screw; 60 outer friction ring; 61 pull rod nut; 62 adjustment plate; 63 oil seal; 64 left end cover; 65 damping member; 66 damping oil cylinder; 67 release screw; 68 rib; 69 locking member.

Figure 1:
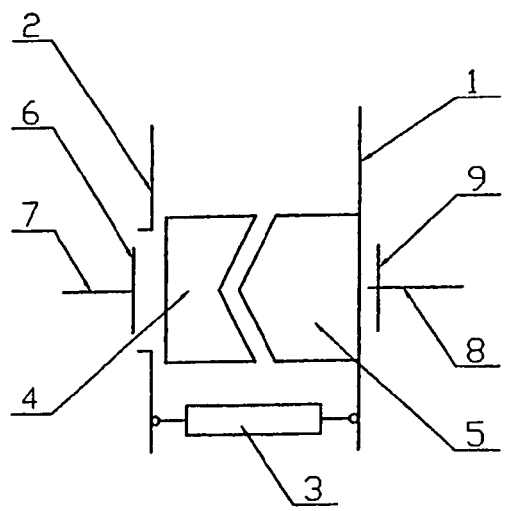
Figure 2:
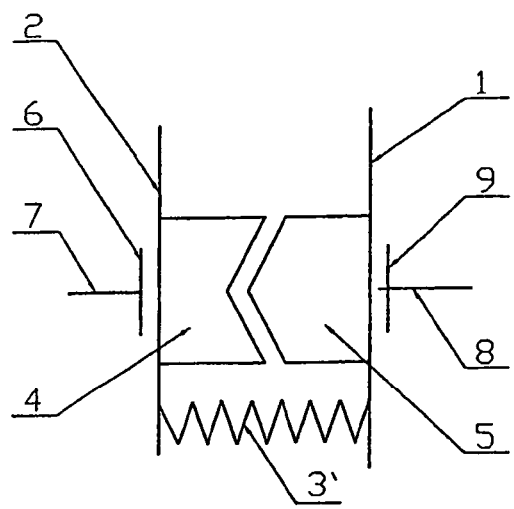
Figure 3:
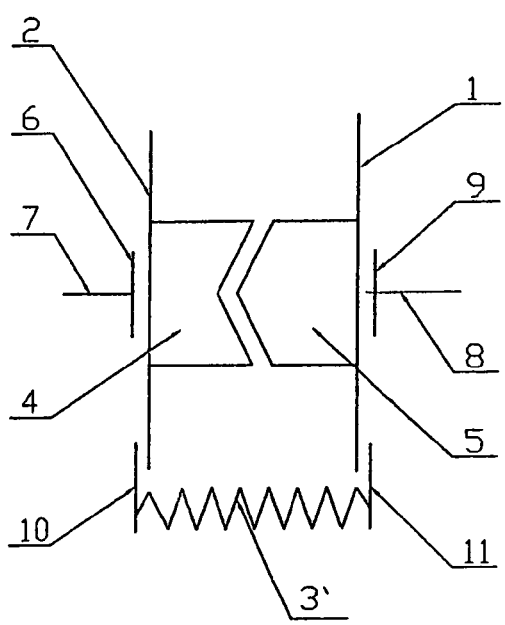
Figure 4:
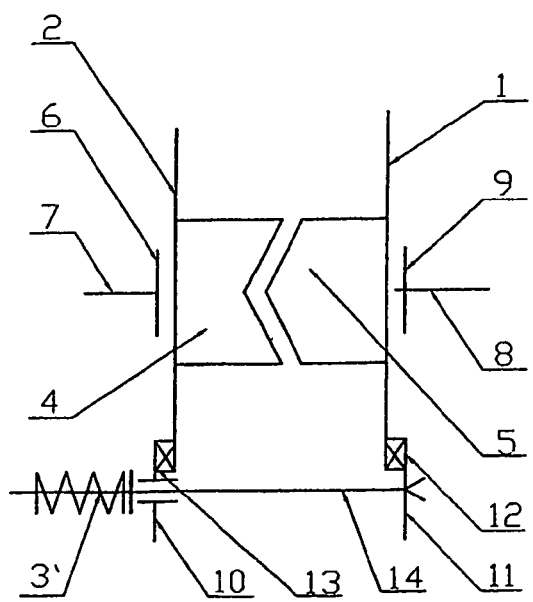
Figure 5:
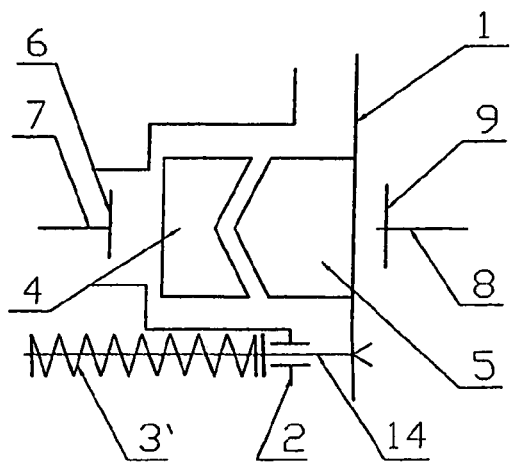
Figure 6:
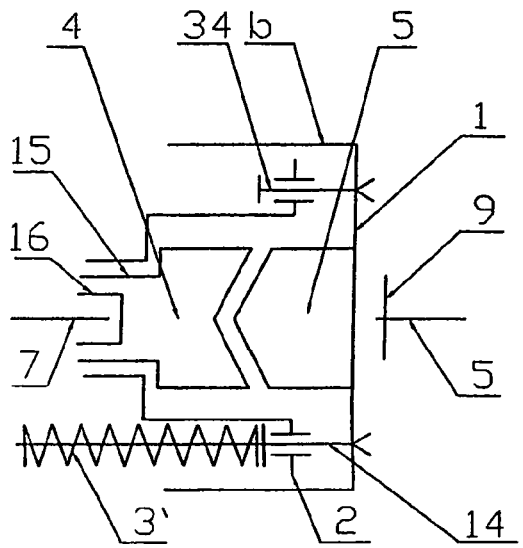
Figure 7:
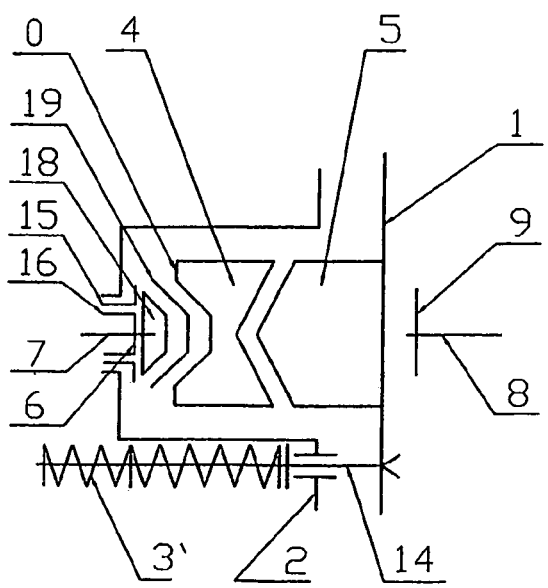
Figure 8:
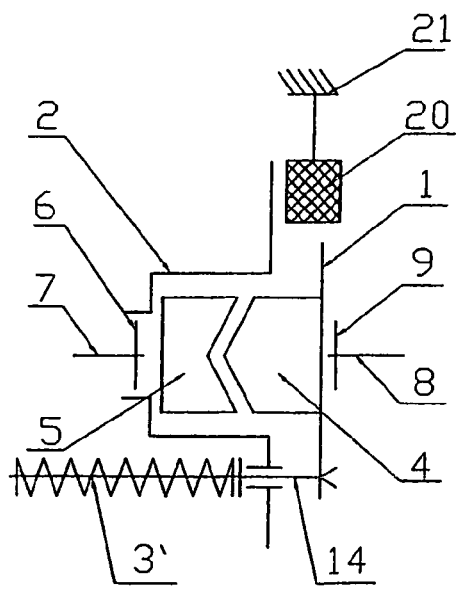
Figure 14:
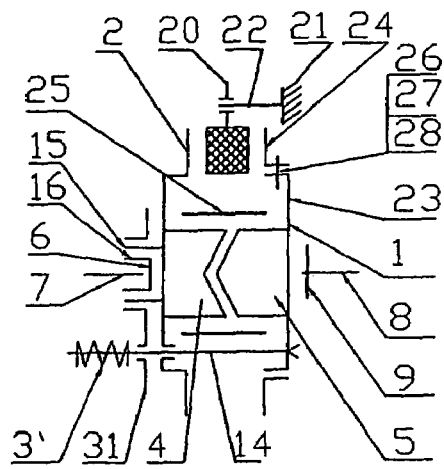
Figure 15:
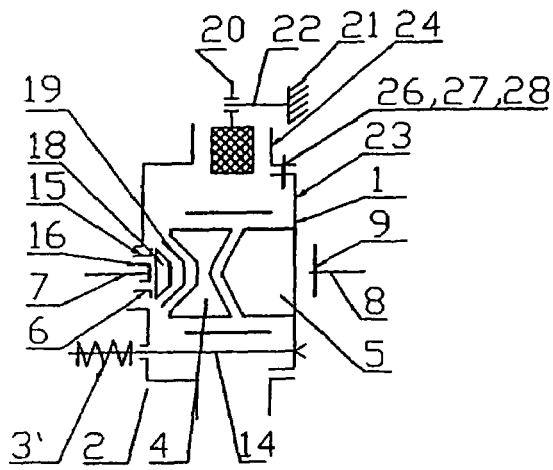
Figure 16:
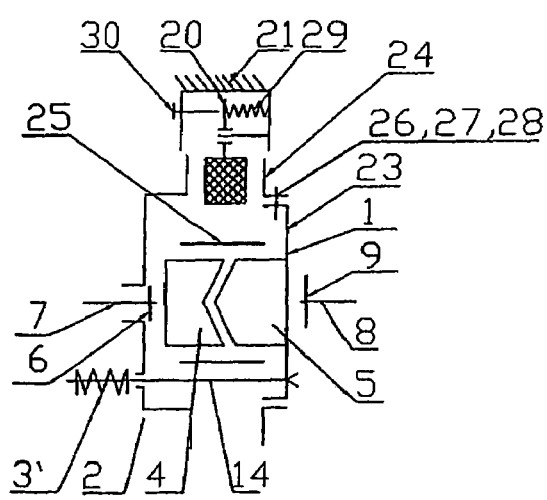
Figure 17:
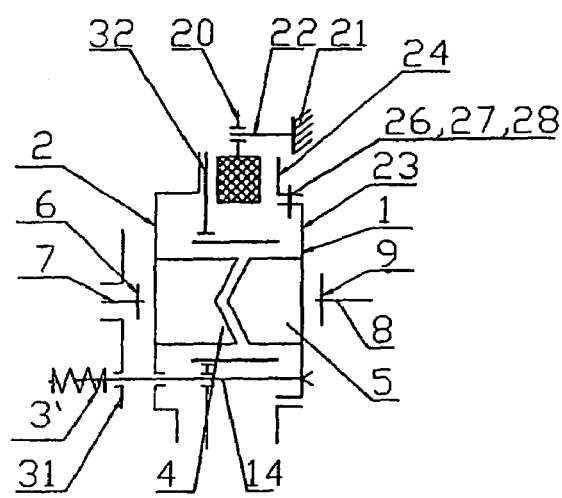
Figure 23:
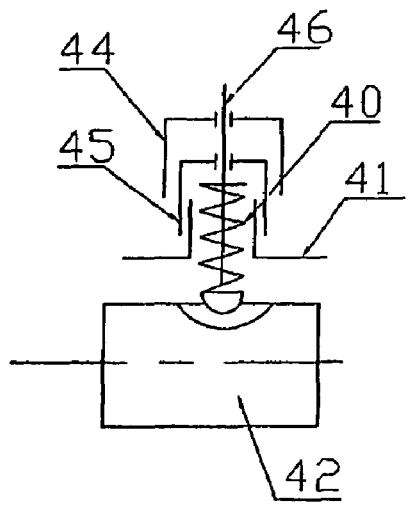
Figure 24:
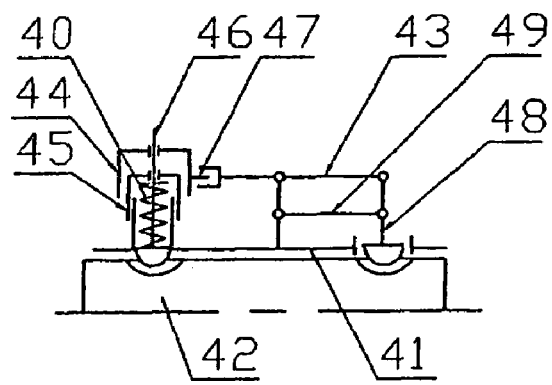
Figure 25:
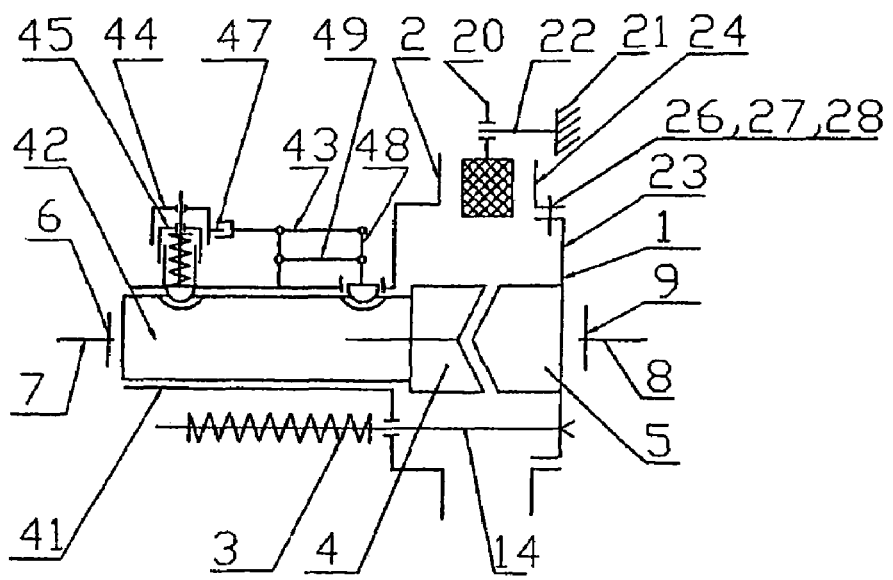
Figure 26:
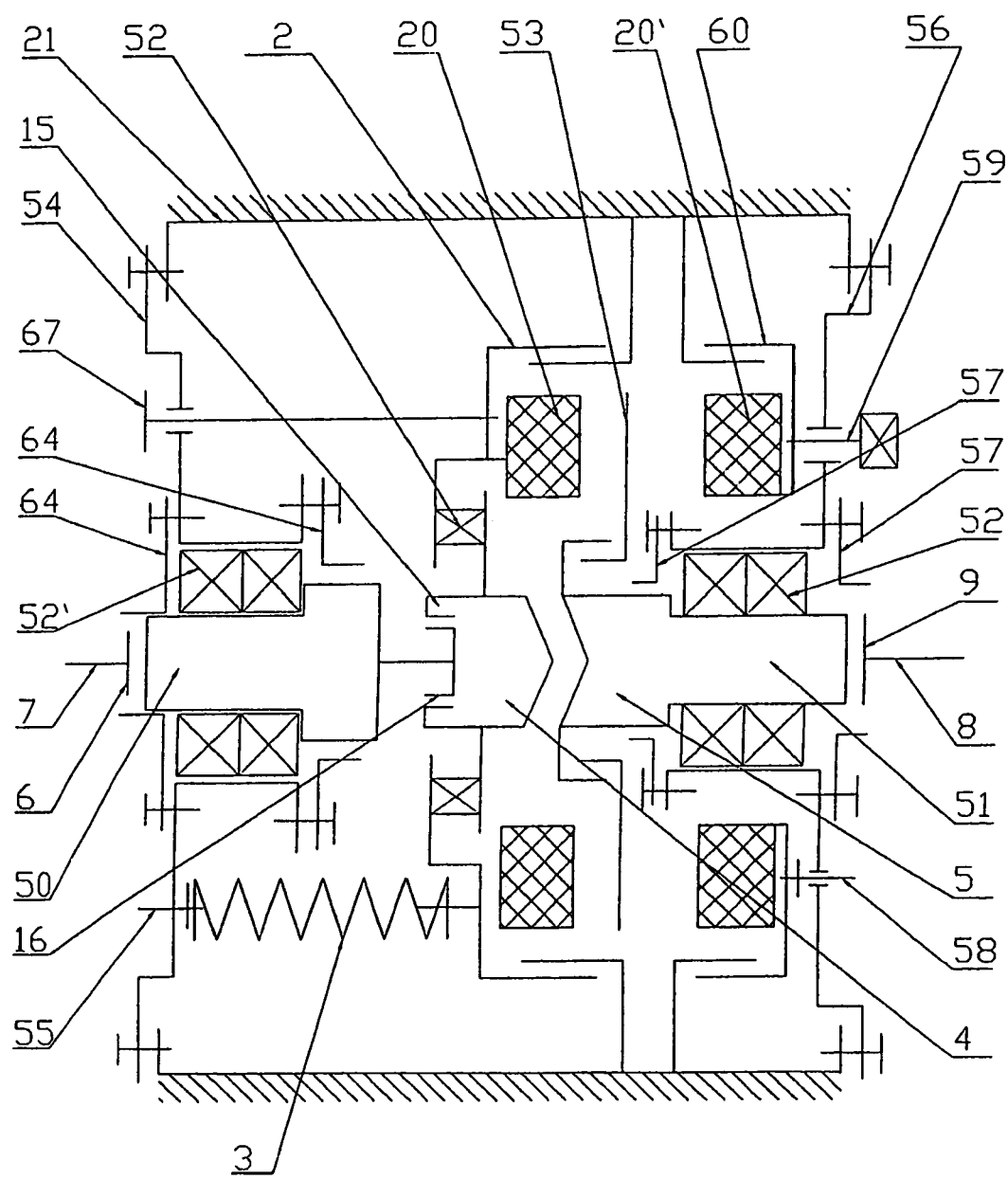
Figure 27:
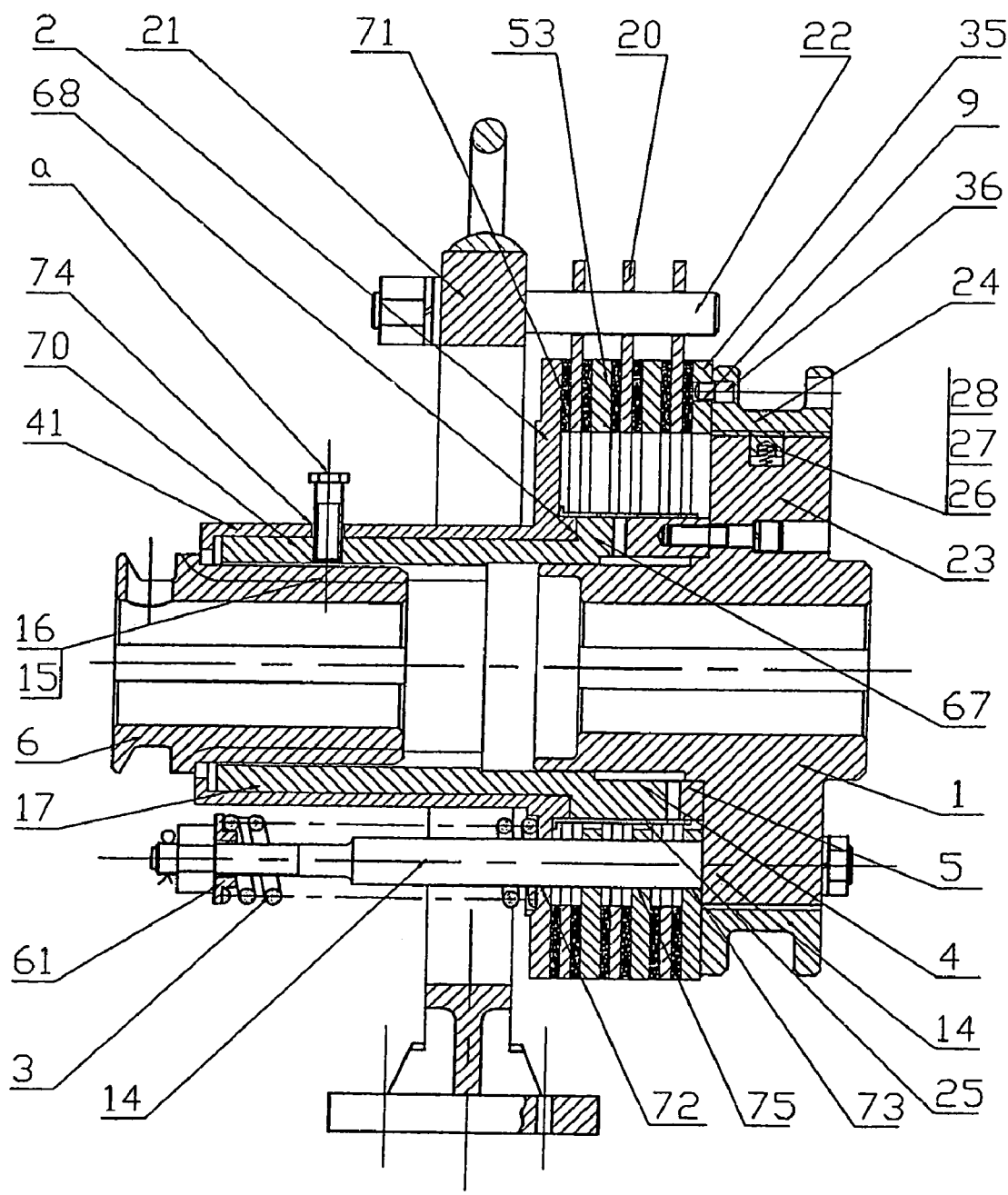
Figure 28:
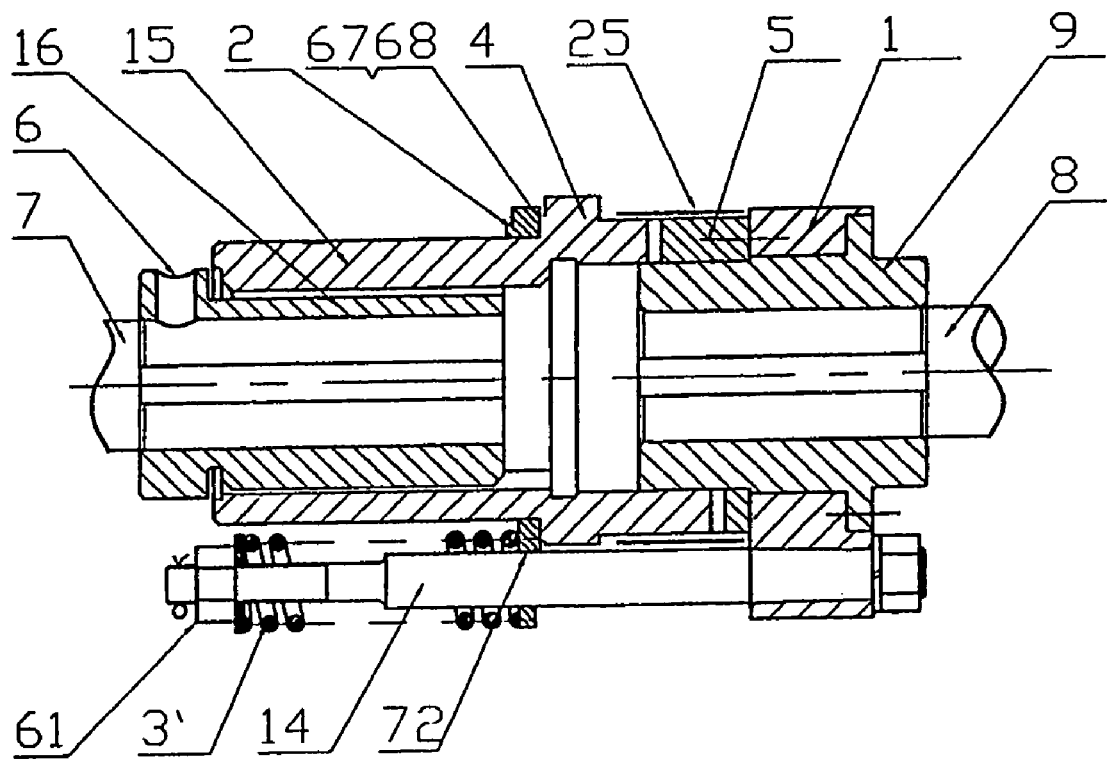
Figure 29:
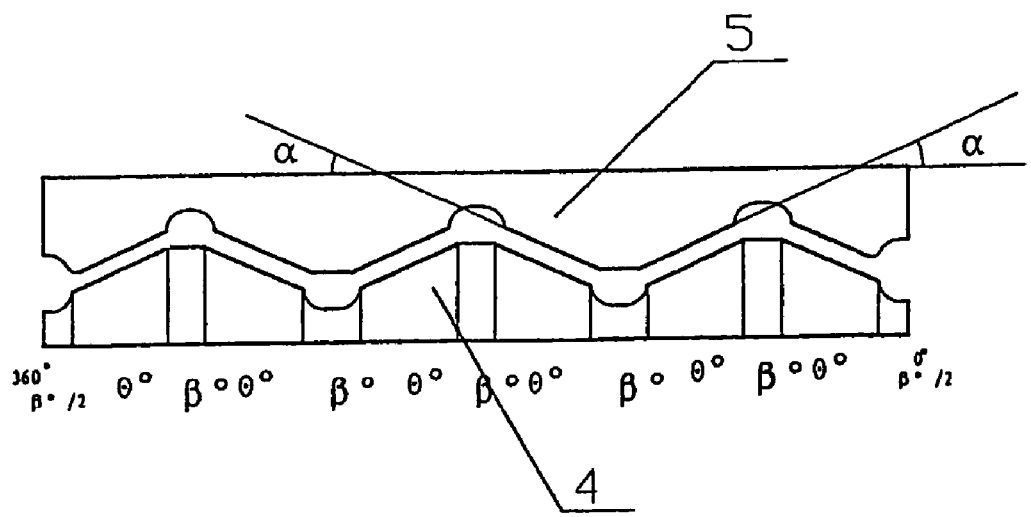
Figure 30:
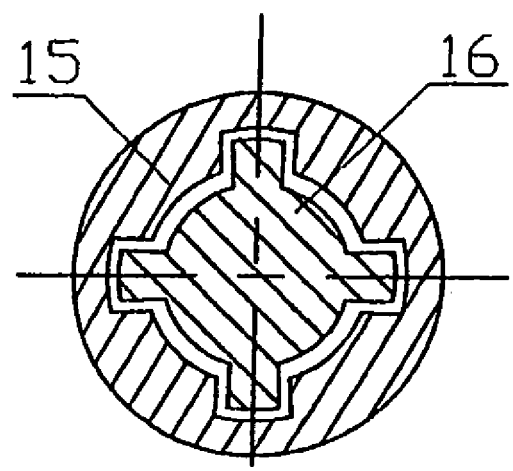
Figure 31:
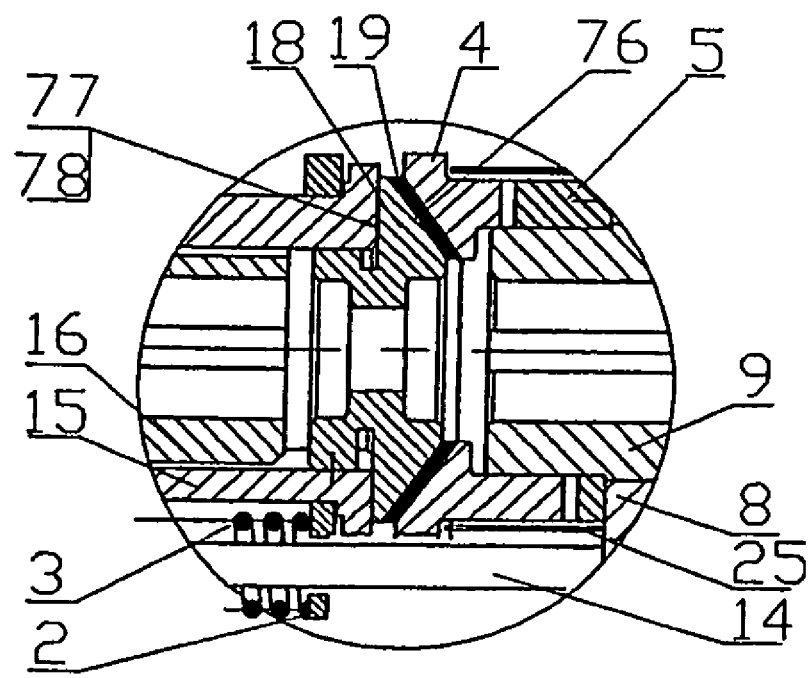
Figure 32:
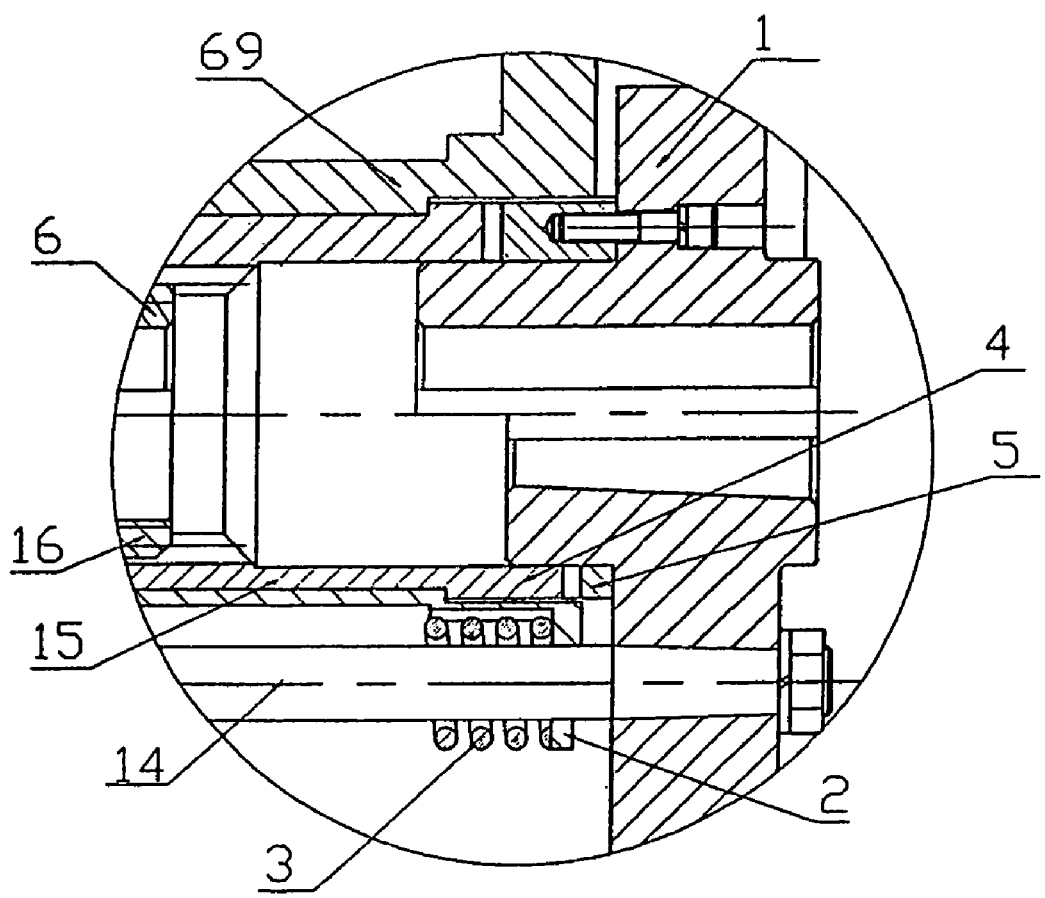
Figure 33:
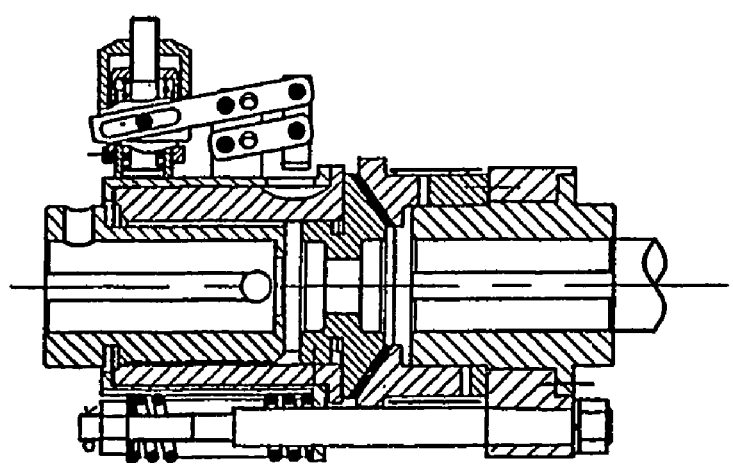
Figure 34:
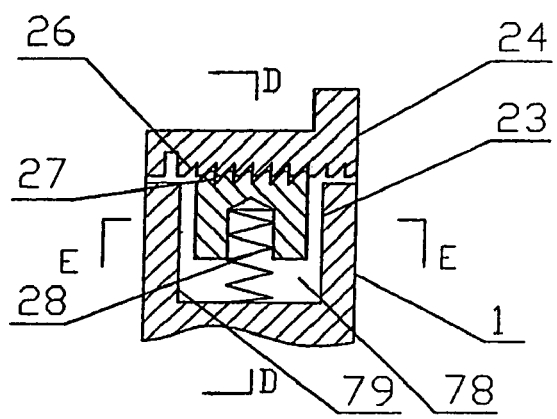
Figure 35:
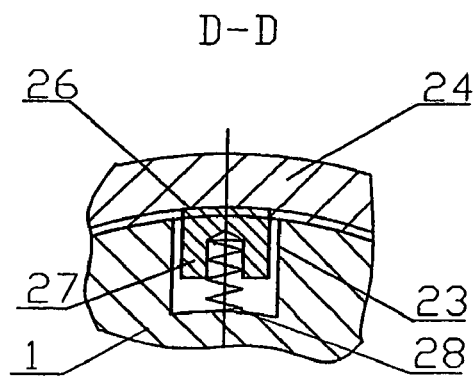
Figure 36:
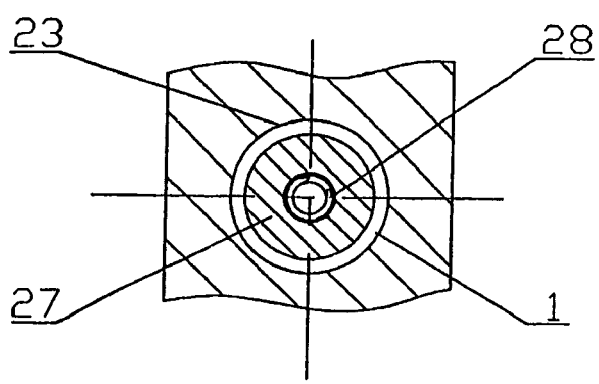
Figure 37:
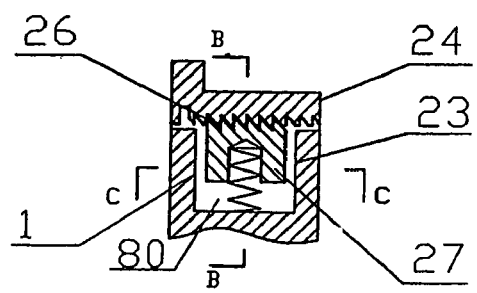
Figure 38:
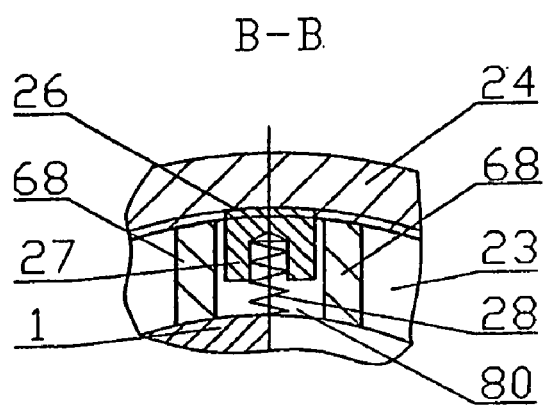
Figure 39:
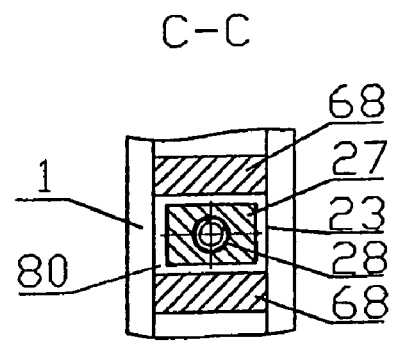
Figure 40:
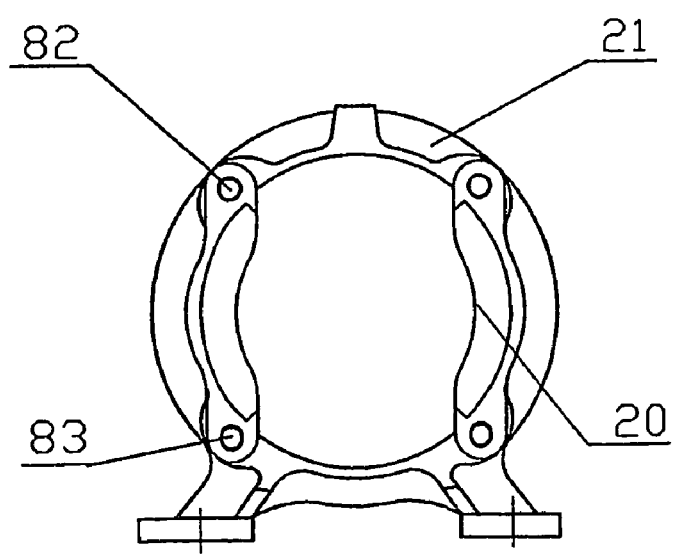
Figure 41:
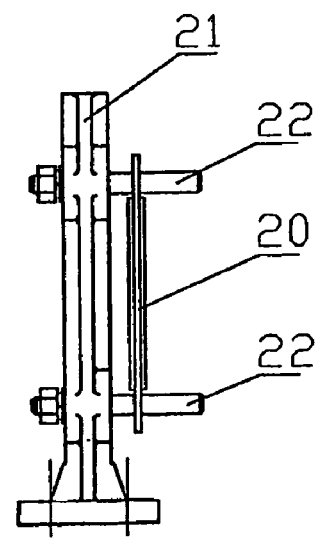
Figure 42:
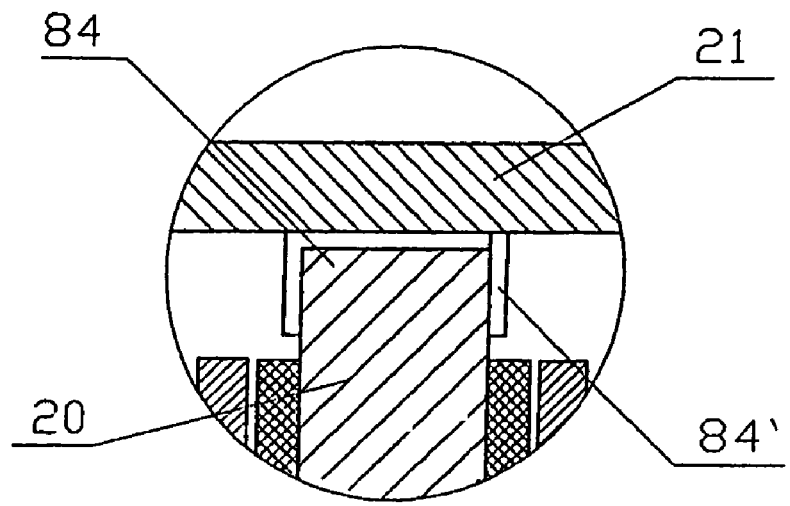
Figure 43:
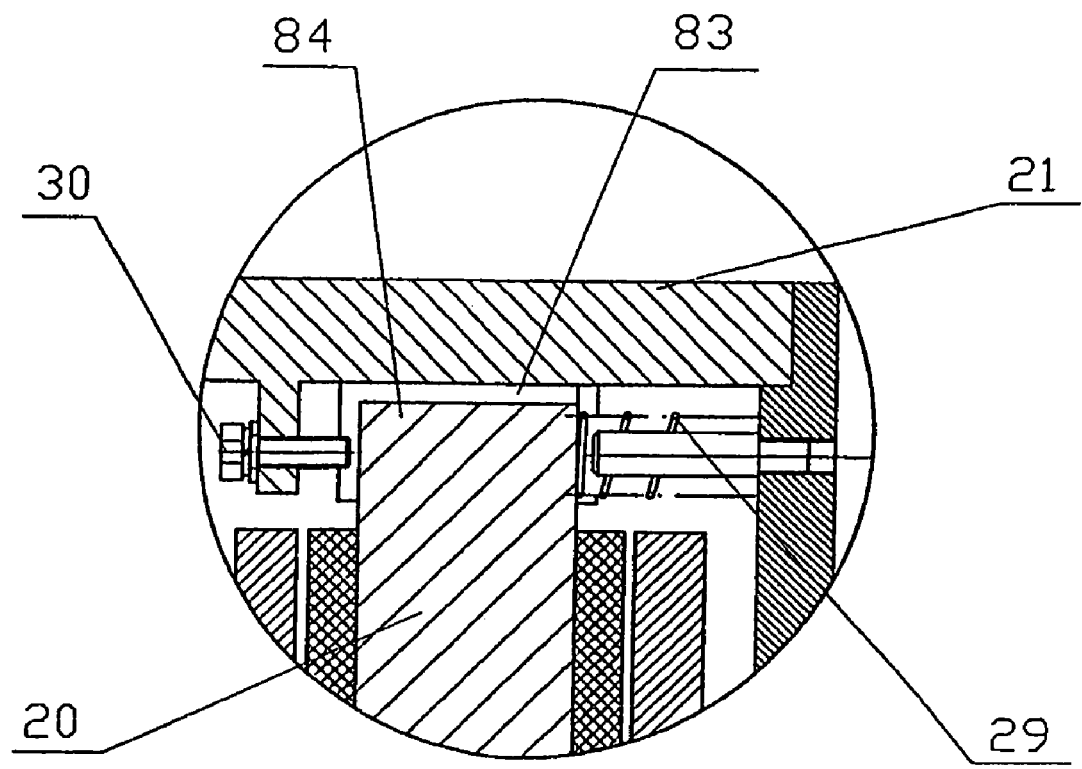
Figure 44:
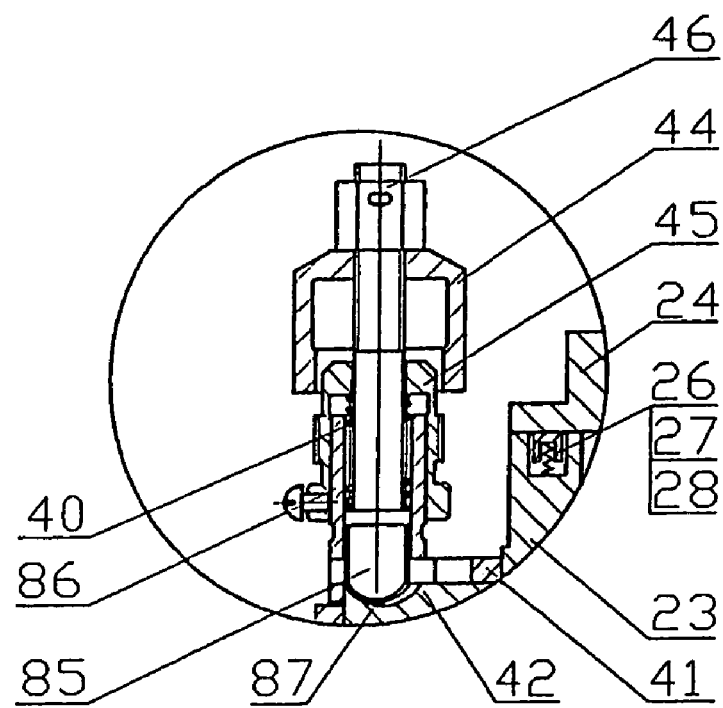
Figure 45:
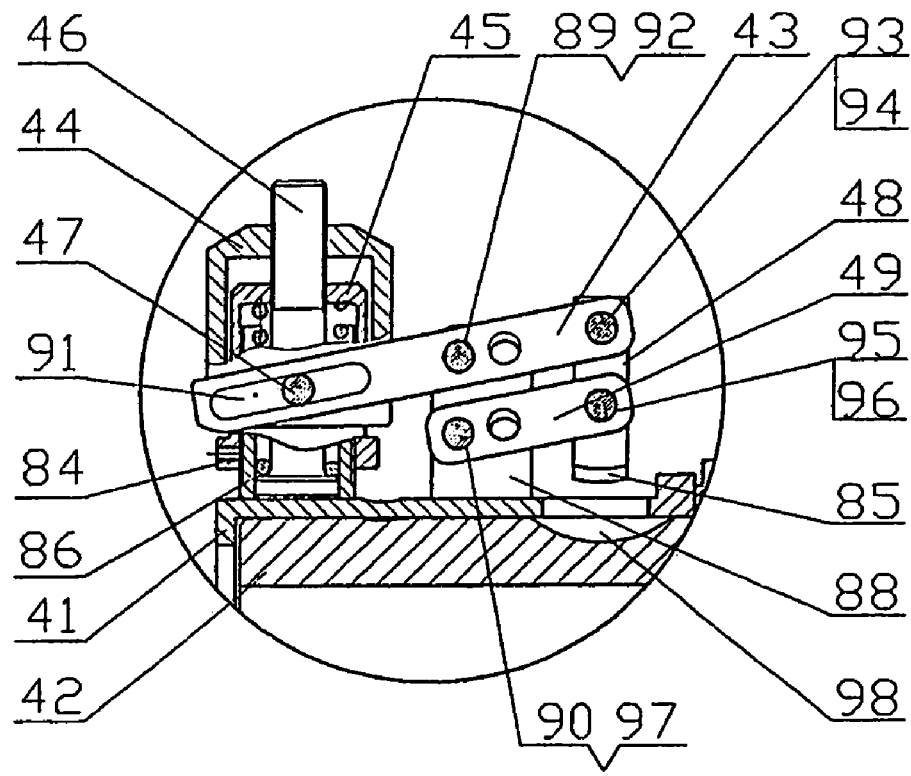
Figure 46:
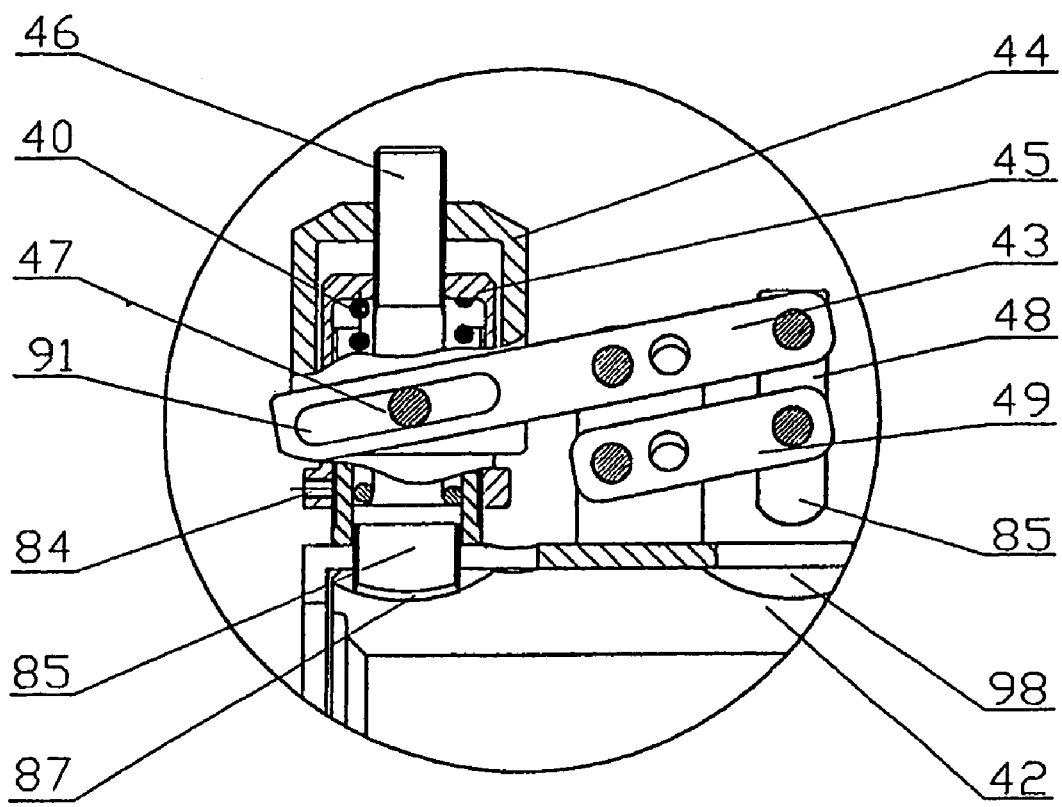
Figure 47:
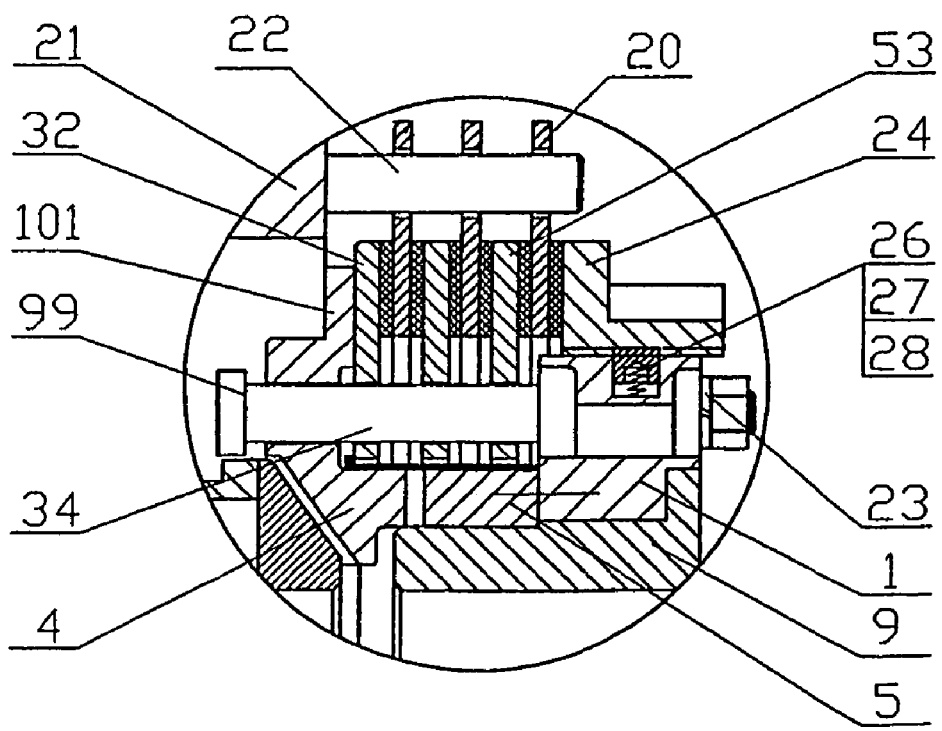
Figure 48:
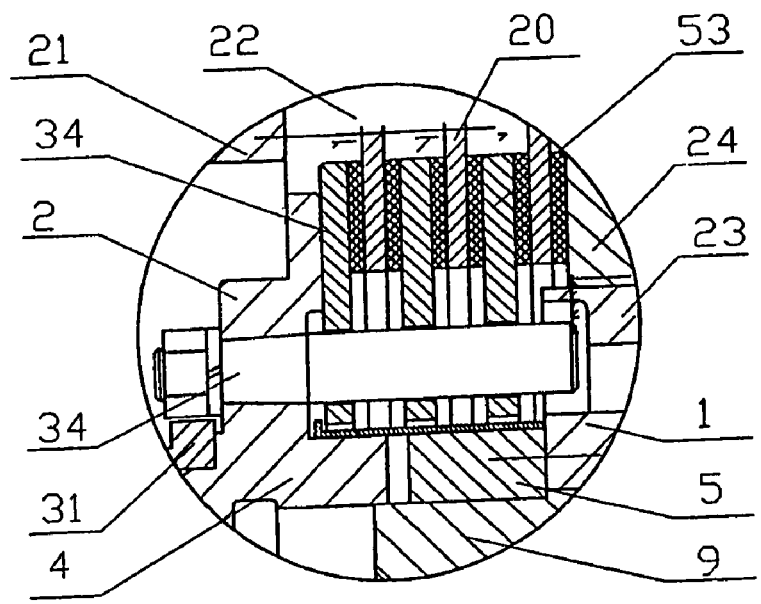
Figure 49:
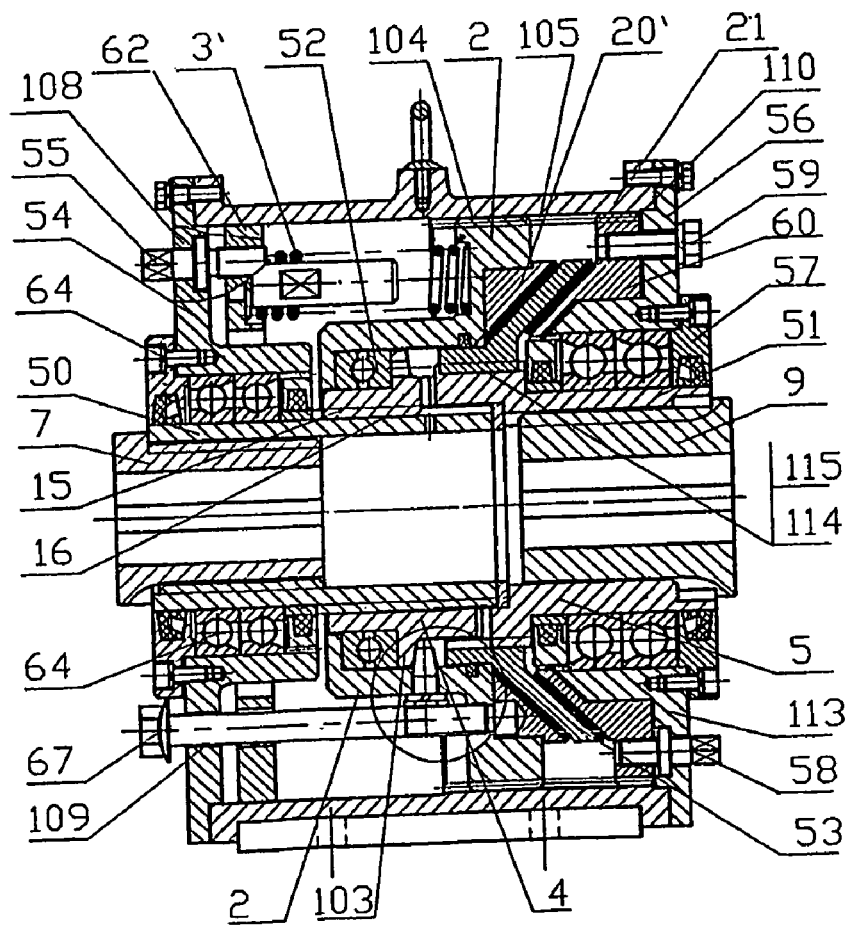
Figure 50:
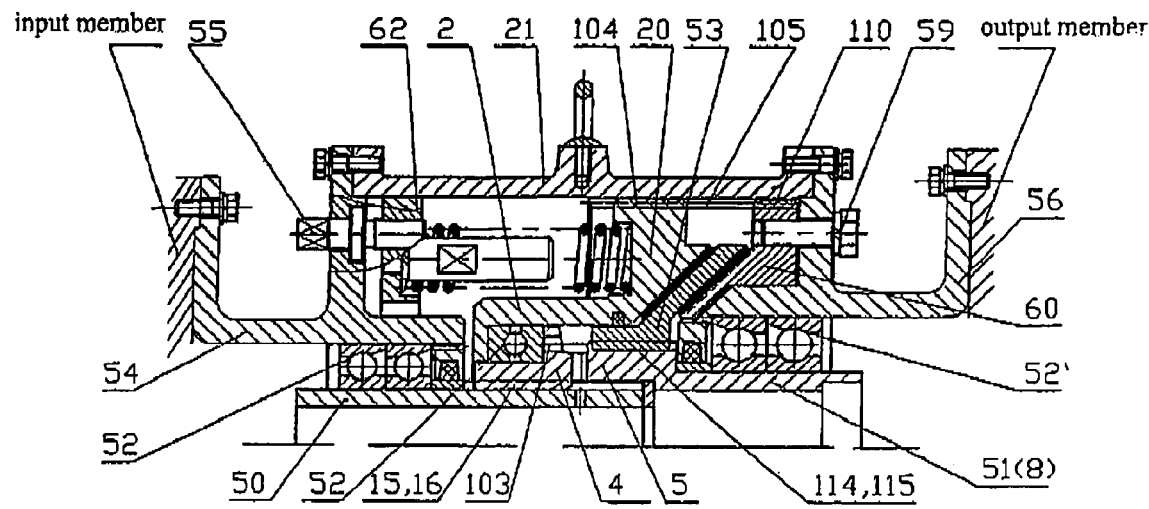
Figure 51:
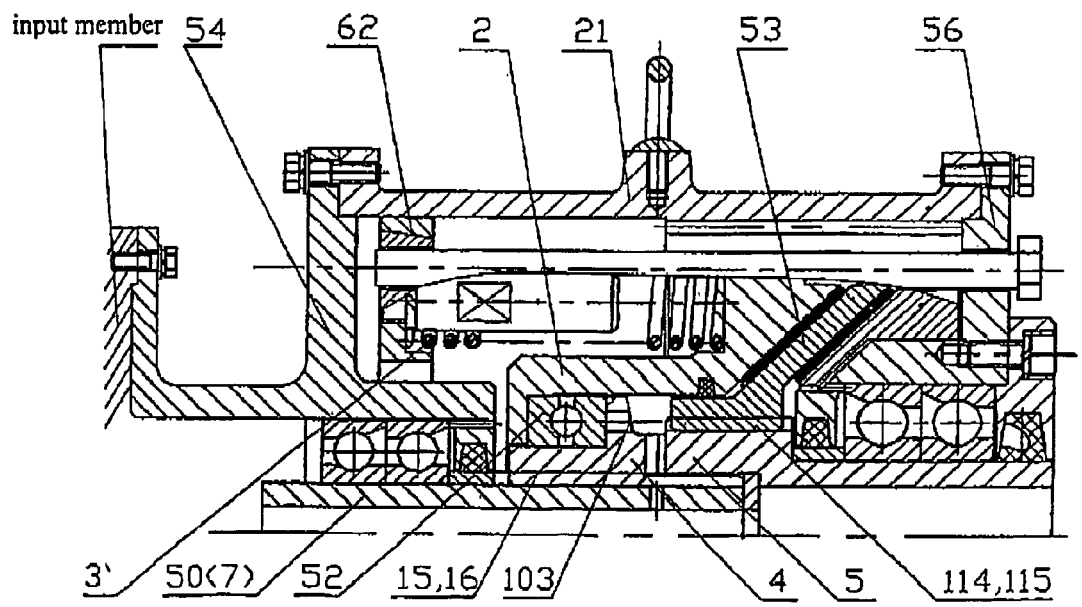
Figure 52:
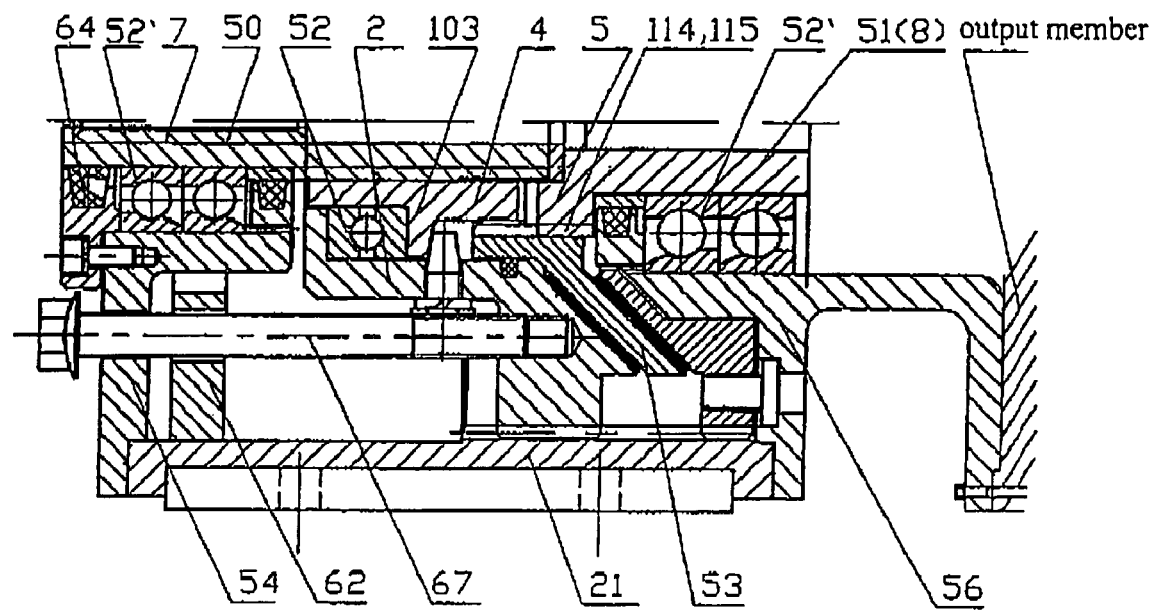
Figure 53:
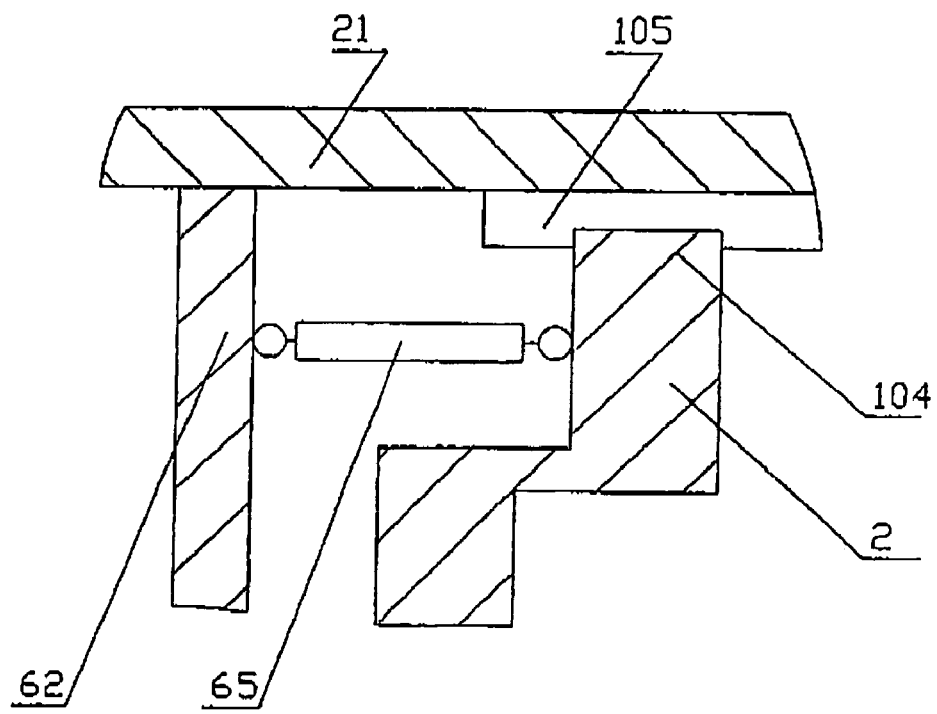
Figure 54:
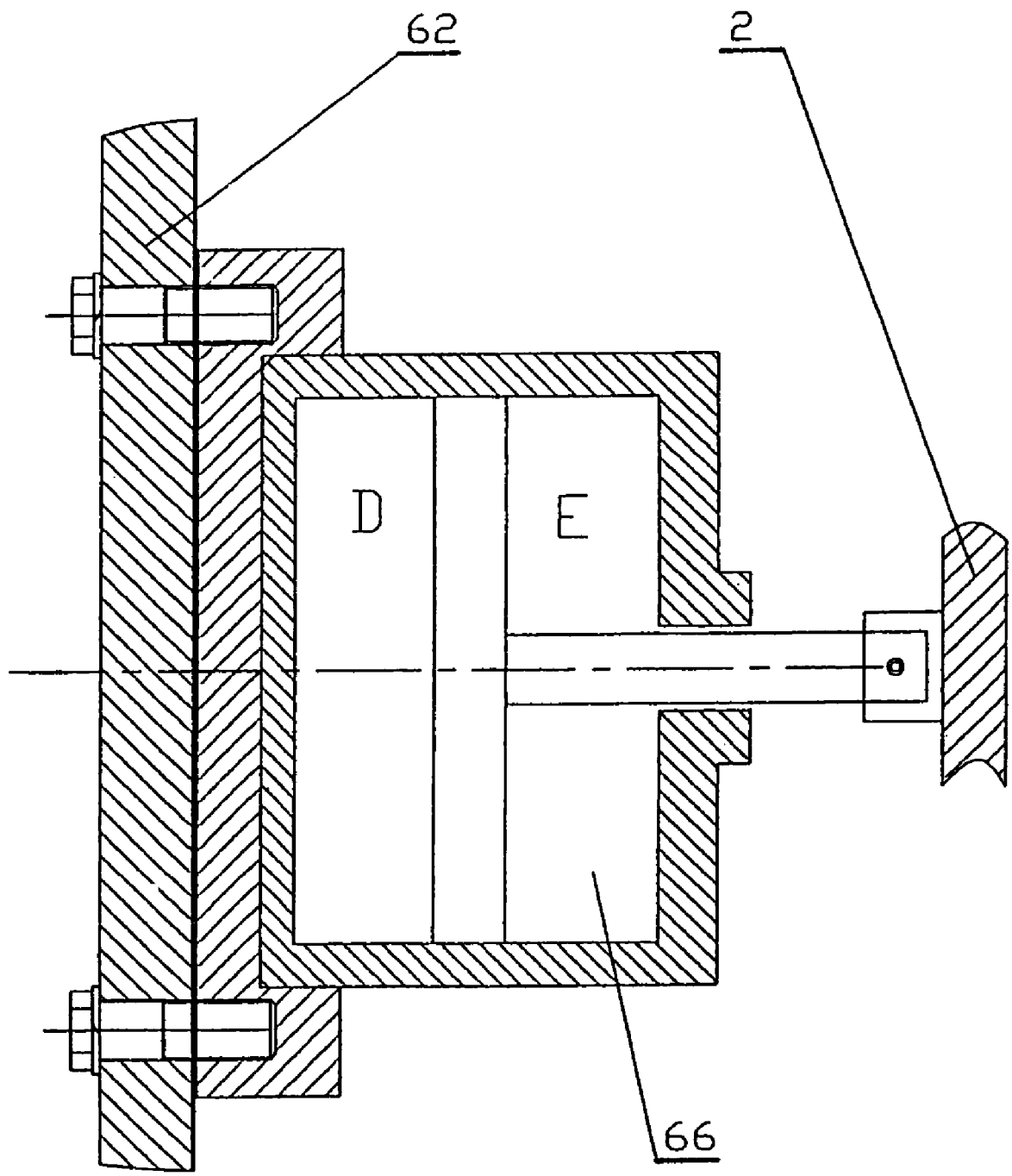

FIG. 1 is a schematic view of a coupling device of the present invention showing the principle of the present invention;

FIG. 2 is an alternative embodiment of the coupling device of the present invention illustrated in FIG. 1;

FIG. 3 is an alternative embodiment of the coupling device of the present invention illustrated in FIG. 1;

FIG. 4 is an alternative embodiment of the coupling device of the present invention illustrated in FIG. 1;

FIG. 5 is an alternative embodiment of the coupling device of the present invention illustrated in FIG. 1;

FIG. 6 is an alternative embodiment of the coupling device of the present invention illustrated in FIG. 1;

FIG. 7 is an alternative embodiment of the coupling device of the present invention illustrated in FIG. 1;

FIG. 8 is a schematic view of a coupling device of the present invention used as a coupling brake device and a coupling clutch device showing the principle of the present invention;

FIG. 9 is an alternative embodiment of the coupling device of the present invention illustrated in FIG. 8;

FIG. 10 is an alternative embodiment of the coupling device of the present invention illustrated in FIG. 8;

FIG. 11 is a schematic view showing construction of a compensation device of the present invention;

FIG. 12 is a cross-sectional view taken along line A-A of FIG. 11 in which the cross section is shown as a rectangular shape;

FIG. 13 is a cross-sectional view taken along line A-A of FIG. 11 in which the cross section is shown as a circle shape;

FIG. 14 is an alternative embodiment of the coupling device of the present invention illustrated in FIG. 8;

FIG. 15 is an alternative embodiment of the coupling device of the present invention illustrated in FIG. 8;

FIG. 16 is an alternative embodiment of the coupling device of the present invention illustrated in FIG. 8;

FIG. 17 is an alternative embodiment of the coupling device of the present invention illustrated in FIG. 8;

FIG. 18 is an alternative embodiment of the coupling device of the present invention illustrated in FIG. 8;

FIG. 19 is an alternative embodiment of the coupling device of the present invention illustrated in FIG. 8;

FIG. 20 is an alternative embodiment of the coupling device of the present invention illustrated in FIG. 5;

FIG. 21 is a schematic view showing the principle of a release-ensuring device according to the present invention;

FIG. 22 is an alternative embodiment of the coupling device of the present invention illustrated in FIG. 21;

FIG. 23 is an alternative embodiment of the coupling device of the present invention illustrated in FIG. 21;

FIG. 24 is a combined arrangement of the device shown in FIG. 21, FIG. 22 and FIG. 23 of the present invention;

FIG. 25 is a schematic view showing the general principle in which the release-ensuring device is applied to a coupling device for a shaft of the present invention;

FIG. 26 is a schematic view showing the general principle in which the release-ensuring device is applied to a coupling clutch device and a coupling brake device of the present invention;

FIG. 27 is a schematic view of the coupling device for a shaft according to the first embodiment of the present invention;

FIG. 28 is a schematic view showing a portion of the coupling device for a shaft according to the first embodiment of the present invention;

FIG. 29 is a partly exploded view of the coupling device for a shaft according to the first embodiment of the present invention;

FIG. 30 is a schematic view showing another part of the coupling device for a shaft according to the first embodiment of the present invention;

FIG. 31 is a schematic view showing an alternative arrangement of a portion of the coupling device according to the first embodiment of the present invention;

FIG. 32 is a schematic view showing another alternative arrangement of a portion of the coupling device according to the first embodiment of the present invention;

FIG. 33 is a schematic view showing another alternative arrangement of a portion of the coupling device according to the first embodiment of the present invention;

FIGS. 34-36 are schematic views showing construction of a circular compensation block for coupling a disk 4 or disk 1 to an outer brake ring 13 according to the first embodiment of the present invention;

FIG. 35 is a cross-sectional view taken along line D-D in FIG. 34;

FIG. 36 is a cross-sectional view taken along line E-E in FIG. 34;

FIGS. 37-39 are schematic views showing construction of a rectangular compensation block for coupling a disk 4 or disk 1 to an outer brake ring 13 according to the first embodiment of the present invention;

FIG. 38 is a cross-sectional view taken along line B-B in FIG. 37;

FIG. 39 is a cross-sectional view taken along line C-C in FIG. 37;

FIGS. 40-41 are schematic views showing a portion of a modified example of a retaining member according to the first embodiment of the present invention, in which FIG. 41 is a side view of the retaining member of FIG. 40;

FIG. 42 is a schematic view showing another modified example of the retaining member according to the first embodiment of the present invention;

FIG. 43 is a schematic view showing another modified example of the retaining member according to the first embodiment of the present invention;

FIG. 44 is a schematic view showing a modified example of the release-ensuring device according to the first embodiment of the present invention;

FIG. 45 is a schematic view showing another modified example of the release-ensuring device according to the first embodiment of the present invention;

FIG. 46 is a schematic view showing another modified example of the release-ensuring device according to the first embodiment of the present invention;

FIG. 47 is a schematic partial view according to the first embodiment of the present invention in which the inner friction ring 53 and the disk 2 are supported and restricted by an inner support pin 34;

FIG. 48 is a schematic partial view according to the first embodiment of the present invention in which the inner friction ring 5 is supported by the disk 2 in lieu of the inner support pin 34;

FIG. 49 is a schematic view of the coupling device according to the second embodiment of the present invention;

FIG. 50 is a schematic view showing a modified example of the second embodiment of the present invention;

FIG. 51 is a schematic view showing another modified example of the second embodiment of the present invention;

FIG. 52 is a schematic view showing another modified example of the second embodiment of the present invention;

FIG. 53 is a schematic view showing the second embodiment of the present invention in which the disk 2 is provided with a damping member 65; and FIG. 54 is a schematic view showing a damping oil cylinder 66 of FIG. 53.

DETAILED DESCRIPTION OF THE PREFERRED EMBODIMENTS

A preferred embodiment of the present invention will be described hereinafter in detail with reference to the attached drawings, wherein the like reference numerals refer to the like elements throughout the specification. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Referring to FIG. 1, the mechanical coupling device for a shaft of the present invention includes a coupling disk 1, a disk 2, a force generating source member 3, and a first and second concave-convex assemblies 4, 5. The characterizing technical feature of the coupling device for a shaft lies in that the first and second concave-convex assemblies 4, 5 are configured to be a press engagement arrangement in which rotational angular displacement and axial displacement relative to each other are operable, wherein the first and second concave-convex assemblies 4, 5 and the disk 2 are configured to be a radial press engagement in which rotational sliding angular displacement relative to each other is operable. An external force association member 6 is provided between the concave-convex assembly 4, 5 and the external force member 7. The external force association member 6 and the first concave-convex assemblies 4 are configured to be a radial press engagement in which axial sliding displacement relative to each other is operable. The second concave-convex assembly 5 is mounted on the coupling disk 1, and two ends of the external force member 3 are connected with the coupling disk 1 and the disk 2, respectively. The disk 1 is mounted to the out-extending shaft 8 through the coupling disk 1 upon operation of the force generating source member 3 or connected to the out-extending shaft 8 through a shaft coupling member 9. Thus, the external force member 7 is connected to the out-extending shaft 8 so that a coupling device is constituted.

Further, a thin wall sleeve protrudes outward from the disk 2 of the coupling device for a shaft and a circular hole is provided on the disk 2. Referring to FIG. 4, a pull rod 14 is provided on the coupling device 1 and passes through the circular hole of the disk 2. The force generating source member 3 is configured to be a press spring 3', and the press spring 3' is fitted over the pull rod 14. One end of the press spring 3 is mounted on the disk 2, and the other end thereof is mounted on the pull rod 14.

Also, in the coupling device for a shaft, as shown in FIG. 6, an inner spline 15 is provided on the first concave-convex assembly 4 so as to engage with an outer spline 16 of the second concave-convex assembly 5. The external force member 7 is associated with the first concave-convex assembly 4 through engagement between the inner spline 15 and the outer spline 16. It can be readily appreciated by those skilled in the art that the inner spline 15 of the first concave-convex assembly 4 can be replaced by an outer spline so as to engage with an inner spline of the second concave-convex assembly 5. Also, another circular hole can be formed on the disk 2, and a limiting pin 17 is mounted onto the coupling disk 1 through the circular holes provided on the disk 2. A larger head portion of the limiting pin 17 engages with the circular hole. Alternatively, a cylindrical brake wheel can be formed to protrude outward the coupling device 1 so as to engage with a tile brake.

In a modified example of the coupling device for a shaft, the arrangement of the first concave-convex assembly 4 and the external force association member 6 are modified, a friction engagement member 18 is provided between the first concave-convex assembly 4 and the second concave-convex assembly 5. Referring to FIG. 7, an inner spline 15 is mounted on the friction engagement member 18. The first concave-convex assembly 4 is provided with a friction surface so as to engage with the friction engagement member 18. Preferably, the friction surface of the first concave-convex assembly 4 and the friction engagement member 18 are engaged with each other by a conical surface. Further, a friction transmission member 19 is provided between the friction engagement member 18 and the first concave-convex assembly 4, 5 so as to form an overload protection device for a shaft with mechanical friction transmission.

As shown in FIG. 8, the present invention further provides a mechanical coupling clutch device and mechanical coupling brake device for a shaft. The mechanical coupling brake device includes a coupling disk 1, a retaining member 21, a friction block 20, a disk 2 with a circular hole and a friction surface, a spring 3, a first and second concave-convex assemblies 4, 5 and a pull rod 14. The coupling brake device of the present invention is characterized in that the first and second concave-convex assemblies 4, 5 are configured to be a press engagement arrangement in which rotational angular displacement and axial displacement relative to each are operable, wherein the first concave-convex assembly 4 and the disk 2 are configured to be a radial press engagement in which rotational sliding angular displacement relative to each other is operable. An external force association member 6 is provided between the first concave-convex assembly 4 and the external force member 7. The external force association member 6 and the first concave-convex assembly 4 are configured to be a press engagement arrangement in which axial sliding displacement relative to each other is operable through the external force association member 6.

The second concave-convex assembly 5 is mounted on the coupling disk 1. The pull rod 14 passes through the circular hole of the disk 2 so as to be mounted to the coupling disk 1. A spring 3 is fitted over the pull rod 14 with one end being press mounted on the disk 2 and the other end thereof being mounted on the other end of the pull rod 14. Upon operation of the spring 3, the disk 2 is associated with a retaining member 21 through engagement between the friction surface of the disk 2 and the friction block 20. The coupling disk 1 is mounted on the out-extending shaft 8 or is coupled to the out-extending shaft 8 through a shaft coupling member 9. When the retaining member 21 is mounted on a relative rotational object, a coupling clutch device is constituted; and when the retaining member 21 is mounted on a relative static object, a coupling brake device is constituted.

In the coupling brake device of the present invention, the friction block 20 is separable from the retaining member 21. Referring to FIG. 9, a support pin 22 is provided on the retaining member 21. A hole is provided on the friction block 20, and the support pin 22 engages with the hole of the friction block 20. A friction surface is provided circumferentially on the coupling disk 1 and the disk 2. Upon operation of the spring 3, the coupling disk 1 and the disk 2 engage with the friction block 20 through the friction surface of the coupling disk 1 and the friction surface of the disk 2, then they are associated with the retaining member 21 through the friction block 20. Alternatively, the friction block 20 is provided with an outer spline so as to engage with the inner spline of the retaining member 21. Also, the friction surface extending from the coupling disk 1 and the disk 2 can be divided into an inner disk body 23 and an outer friction ring 24, as shown in FIG. 10. The inner disk body 23 can be directly associated with the outer friction ring 24 or be indirectly associated with the outer friction ring 24 through a compensation device. Similarly, a thin wall sleeve 25 can also be mounted on the second concave-convex assembly 5.

As shown in FIGS. 11-13, the mechanical gap adjustment and compensation device for a shaft includes an inner disk body 23, an inner threaded ring 26, an outer threaded block 27 and a compensation spring 28. The compensation device of the present invention is characterized in that the inner disk body 23 is provided with the outer threaded block 27 which is used for limiting in an axial and circumferential direction. The outer threaded block 27 can be configured to be in a rectangular shape as shown in FIG. 12 or a cylindrical hole as shown in FIG. 13. The outer threads of the outer threaded block 27 is configured to be sawtooth type threads, and the inner threads of the inner threaded ring 26 is also configured to be sawtooth type threads so as to engage with the outer threaded block 27. One end of a compensation spring 28 is connected to the outer threaded block 27 while another end thereof is associated with the inner disk body 23.

Due to application of the compensation device into the coupling brake device for a shaft and a coupling clutch device for a shaft, the friction surfaces extending from the coupling disk 1 and the disk 2 can be separated on which axial and circumferential limiting means can be arranged. Alternatively, an inner threaded ring 26 is directly processed on the outer friction ring 24 in lieu of the inner disk body 23. The outer threaded block 27 can be formed into a rectangular or circular shape.

Further, in the coupling brake device for a shaft of the present invention, the external force association member 6 is provided with an outer spline 16, as shown in FIG. 14. An inner spline 15 is provided on the first concave-convex assembly 4. The external force 7 is connected to the out-extending shaft 8 through a radial press engagement in which an axial sliding displacement between the inner spline 15 and an outer spline 16. Alternatively, the inner spline can be replaced by an outer spline and the outer spline can be replaced by an inner spline so as to form a spline assembly.

Further, in the coupling brake device for a shaft of the present invention, a circular hole is further formed on the coupling disk 2. A limiting pin 34 with a larger head portion is mounted onto the coupling disk 1 through the disk 2, as shown in FIG. 6, and the larger head portion is engaged with the circular hole of the disk 2.

Further, in the coupling brake device of the present invention, the association arrangement in which the first concave-convex assembly 4 associates with the external force association member 6 can be modified. As shown in FIG. 15, the first concave-convex assembly 4 is provided with a conical friction engagement surface which engages with the friction engagement member 18. Also, a friction 19 can be provided between the friction engagement member 18 and the first concave-convex assembly 4. Thus, an overload protection device for a shaft with a mechanical friction transmission mechanism is constituted.

Further, in the coupling brake device of the present invention, the retaining member 21 may be modified. As shown in FIG. 16, an adjustment spring 29 and an adjustment screw 30 are provided. One end of the adjustment spring 29 is associated with the friction block 20, and the other end of the adjustment spring 29 is associated with the retaining member 21. The adjustment screw 30 is mounted on the retaining member 21 so as to associate with the friction block 20. An inner spline is provided on the retaining member 21 so as to engage with an outer spline provided on the friction block 20.

Further, in the coupling brake device of the present invention, a left friction ring 32 and a press plate 31 with a hole are provided, as shown in FIG. 17. A hole is provided on the left friction ring 32, and the left friction ring 32 is mounted onto the pull rod 14 through the hole. The left friction ring 32 is associated with the disk 2 in the left side and is associated with the friction block 20 in the right side of the left friction ring 32. The press block 31 is mounted onto the pull rod 14 through the hole. In the left side of press plate 31, the press plate 31 is associated with the press spring 3 and is associated with the disk 2 in the right side thereof.

Further, in the coupling brake device of the present invention, a right friction ring 33 is provided, and a circular hole is provided on the right friction ring 33. A limiting pin 34 is fixedly attached to the disk 2, and the right friction ring 33 is mounted onto the limiting pin 34 through the circular hole. In the left side of the right friction ring 33, the right friction ring 33 is associated with the friction block 20. In the right side of the right friction ring 33, the right friction ring 33 is associated with the outer friction ring 24. In a reversed form, the external member 7 can be used as an out-extending shaft and the out-extending shaft 8 can be used as an external force member 7.

Further, in the coupling brake device for a shaft of the present invention, the friction block 20 is an arcuate section with a circular hole and an elongated hole. The friction block 20 is mounted onto the retaining member 21 through the circular hole and the elongated hole so as to engage with the support pin 22. Further, the friction block 20 is associated with the friction disk 2 and the outer friction ring 24. Preferably, two friction blocks 20 engage with four support pins 22. The circular hole is provided at an upper side of the friction block 20 and the elongated hole is provided at a lower side of the friction block 20, as shown in FIG. 40.

Further, in the coupling brake device of the present invention, a side friction ring 35 is provided, as shown in FIG. 19. The side friction ring 35 is provided with a key hole so as to engage with a key pin 36 provided on the outer friction ring 24. The right friction ring 35 is mounted onto the pull rod 14 through the circular hole thereof. The right friction ring 35 is associated with the friction block 20 in the left side thereof. The right friction ring 35 is associated with the outer friction ring 24 through the key hole and the key pin 36. The outer friction ring 24 is associated with the coupling disk 1 through the side friction ring 24 and the pull rod 14.

Further, in the coupling brake device of the present invention, a release member 37 is provided, as shown in FIG. 20. The release member 37 is fixedly mounted onto the left friction ring 32, and the right side of the release member 37 is associated with the disk 2.

Also, a mechanical release-ensuring device attached to a coupling device is provided by the present invention, as shown in FIGS. 21-25. A confronting member 42 which is a modified form of the external force member 6 is provided with threads so as to engage with a hole provided on a thin wall sleeve 41 extending from the disk 2. When the threads provided on the confronting member 42 correspond to the hole due to application of external force, a locking member "a" which is provided outside of the device can be used to lock them in place.

Another arrangement of the release-ensuring device is shown in FIG. 22. The release-ensuring device includes an insert rod 38, a centrifugal member 39, a release-ensuring spring 40, a release-ensuring frame 41 and a confronting member 42. The insert rod 38 is connected to the centrifugal member 39 through a lever 43. The insert rod 38 is provided with a hinge hole and a plug so as to engage with a slot of the locked confronting member 42. The locked release-ensuring frame 41 is provided with a hinge hole, and the insert rod 38 is mounted onto the release-ensuring frame 41 through the hinge rod. One end of the release-ensuring spring 40 is connected to the centrifugal member 39, and the other end of the release-ensuring spring 40 is connected to the release-ensuring frame 41. With the above construction, angular displacement relative to each other between the external force member 7 and the out-extending shaft 8 are to be locked. If the insert rod 38 is associated with the external force member 7, the insert rod 38 is intended to be associated with the slot of the confronting member 42 associated with the out-extending shaft 8. On the other hand, if the insert rod 38 is associated with the out-extending shaft 8, the insert rod 38 is intended to be associated with the slot of the confronting member 42 associated with the external force member 7.

Further, in the release-ensuring device of the present invention, a cap 45 is provided as shown in FIG. 23. The release-ensuring spring 40 is a press spring, and the centrifugal member 39 is modified to be a centrifugal cap 44. An outer threaded cylinder is provided on the release-ensuring frame 41. The insert rod 38 is modified as a front insert rod 46, and a spring seat is provided at a lower side of the front insert rod 46. The front insert rod 46 is attached to centrifugal cap 44. The front insert rod 46 is mounted inside the outer threaded cylinder of the release-ensuring frame 41. One end of the release-ensuring spring 40 is associated with the spring seat of the front insert rod 46, and the other end of the release-ensuring spring 40 is associated with the cap 45. Inner threads of the cap 45 are engaged with outer threaded cylinder of the release-ensuring frame 41 so as to be connected to the release-ensuring frame 41. The front insert rod 46 is provided with a plug so as to engage with the confronting member 2. Also, inner threads are provided inside the centrifugal cap 44 while outer threads are provided on the cap 45 so as to form a locking mechanism with threads.

Further, in the release-ensuring device of the present invention, the centrifugal cap 44 is provided with a connection pin 47, as shown in FIG. 24. Further, a lever 43 and a connection rod 49 are provided. The lever 43 is provided with an associated elongated hole, a left hinge hole and right hinge hole. A support arm of the release-ensuring frame 41 is provided with an upper hinge hole and a lower hinge hole. Also, the rear insert rod 48 is provided with an upper hinge hole and a lower hinge hole. Further, the connection rod 49 is provided with a static hinge hole and a movable hinge hole. The above corresponding hinge holes are engaged with each other and connected by 4 pins so as to form a four-linkage mechanism. The centrifugal cap 44 is associated with an elongated hole of the lever 43 through an association pin 47. The rear insertion rod 48 engages with a rear slot of the locked confronting member 42. The front insertion rod 46 engages with the front slot of the confronting member 42. Alternatively, an assembly in which a front plug without head portion and a rear insert rod without head separately engage with the locked slot can be formed.

Next, FIG. 25 shows an assembly in which a coupling device for a shaft, a coupling brake device for a shaft and a release-ensuring device are combined. As shown in FIG. 25, a circular hole of the release-ensuring frame 41 and a circular hole of the disk 2 are associated with the coupling disk 1 through the pull rod 14. The slot is provided on the confronting member 42 of the first concave-convex assembly 4 which is a modified arrangement for the external force association member 6. Thus, a release-ensuring device comprising a slot, an insertion rod, a release-ensuring frame, a pull rod, a coupling disk, a concave-convex assembly engagement surface and a slot is achieved.

A combination of a coupling device for a shaft, a coupling clutch device and a coupling brake device with bearings supporting on both ends thereof is shown in FIG. 26. A coupling device for a shaft includes a first and second concave-convex assemblies 4, 5, a force generating source member 3, a disk 2, a left shaft transition member 50, a right shaft transition member 51, a bearing 52 and a retaining member 21. The coupling clutch device for a shaft and the coupling brake device for a shaft further include a friction block 20, 20', an inner friction member 53. The first concave-convex assembly 4 is mounted on the left end plate through external force member 7 or left shaft transition member 50. The left end plate 54 is mounted on the retaining member 21, and a ring protruding from the first concave-convex assembly 4 is associated with the disk 2. Alternatively, the ring may be indirectly associated with the disk 2 through a bearing 52. One end of a press spring of the force generating source member 3 is connected with the disk 2, and the other end of the press spring is connected to the left end plate 54. Alternatively, the other end of the press spring is indirectly connected to the left end plate 54 through spring force adjustment member 55.

The second concave-convex assembly 5 is mounted onto the right end plate 56 through the out-extending shaft 8 or the right transition member 51. The right end plate 56 is mounted on the retaining member 21, and the left and right bearing 52', 52' are axially mounted by the left cap 64 and the right cap 57, respectively. The external force member 7 is connected to the first concave-convex assembly 4 through the external force association member 6 or the left shaft transition member 51, and the out-extending shaft 8 is connected to the second concave-convex assembly 5. Alternatively, the out-extending shaft 8 is indirectly connected to the second concave-convex assembly 5 by a right shaft transition member 51. Thus, a coupling device for a shaft is achieved.

The disk 2 is provided with a friction block 20' and an outer spline, and an outer friction ring 60 with an outer spline is provided on the right end plate 56 so as to engage with the inner spline of the retaining member 21. An inner friction member 53 is provided between the friction block 20 and the outer friction ring 60. The inner friction member 53 is provided with inner spline so as to engage with the outer spline provided on the second concave-convex assembly 5. Operation of clutching and braking is performed by engagement between the inner friction member 53 and the friction block 20 and the outer friction ring 60. Provided that the retaining member 21 is mounted on a relative rotational object, the above device functions as a coupling clutch device for a shaft; provided that the retaining member 21 is mounted on a relative static object, the above device functions as a coupling brake device for a shaft. A release screw 67 passes through a hole of the left end plate 54 so as to be inserted into a threaded hole of the disk 2. With this construction, a release brake and clutch mechanism is completed. A large head portion of a gap adjustment member 57 engages with the hole of the right end plate, and a tightening screw 59 engages with the hole of the right end plate. Thus, friction release gap of the friction block 20 can be adjusted.

Thereafter, the inventive concept and the technical scheme of the present invention will be described with reference to the drawings.

The present invention provides a mechanical coupling device for a shaft. As shown in FIG. 1, the coupling device for a shaft comprises a coupling disk 1, a disk 2, a force generating source member 3, a first and second concave-convex assemblies 4, 5, characterized in that the first and second concave-convex assemblies 4, 5 are configured to be a press engagement arrangement in which rotational angular displacement and axial displacement relative to each other are operable. The first concave-convex assembly 4 and the disk 2 are configured to be a radial press engagement in which rotational sliding angular displacement relative to each other is operable. An external force association member 6 is provided between the concave-convex assembly 4, 5 and the external force member 7. The external force association member 6 and the first concave-convex assembly 4 are configured to be press engagement arrangement in which axial sliding displacement relative to each other is operable through operation of the external force association member 6. The second concave-convex assembly 5 is mounted on the coupling disk 1, and two ends of the external force member 3 are connected with the coupling disk 1 and the disk 2. The disk 1 is mounted to the out-extending shaft 8 through the coupling disk 1 or connected to the out-extending shaft 8 through a shaft coupling member 9. Thus, a coupling device for a shaft is constituted.

As shown in FIG. 2, the force generating source member is configured to be a pull spring 3'. The two ends of pull spring 3' are mounted to the coupling disk 1 and the disk 2.

As shown in FIG. 3, the pull spring 3' may be press engaged with and connected to the coupling disk 1 and the disk 2 through force transition members 10, 11.

As shown in FIG. 4, if the force generating source member 3 is configured to be a press spring 3, a pull rod 14 can be provided. One end of the pull rod 14 is mounted onto a link member 11, and the other end thereof passes through a hole of the link member 10. The press spring 3 is mounted on the pull rod 13. One end of the press spring 3 is pressed against and connected to the link member 10, and the other end of the press spring 3 is connected to the other end of the pull rod 14. At this time, the press spring 3, the link members 10, 11 and the pull rod 14 are mounted on a relatively immovable member. Alternatively, the above components may be configured to rotate together with the coupling disk 12. Also, bearings 12, 13 are employed to connect the link members 10, 11 with the disk 2 and the coupling disk 1.

As shown in FIG. 5, one end of the pull rod 14 is directly mounted to the coupling disk 1, and the other end of the pull rod 14 passes through the hole of the disk 2 and the press spring 3 so as to be mounted onto the pull rod 14. One end of the press spring 3 is pressed against and connected to the disk 2, and the other end of press spring 3 is connected to the other end of the pull rod 14.

As shown in FIG. 6, in the first and second concave-convex assemblies 4, 5, a limiting pin 34 is arranged to limit the axial displacement of the first and second concave-convex assemblies 4, 5. Alternatively, a limiting pin 34 is provided to pass through the hole of the disk 2 so as to be mounted to the coupling disk 1. Also, a cylindrical brake roller "b" projecting from the coupling disk 1 can be employed so as to operate in conjunction with the tile brake provided outside of the device. An inner spline 15 is provided on the first concave-convex assembly 4, and an outer spline 16 is provided on the external force association member 6. The inner spline 15 and the outer spline 16 are configured to engage with each other in press engagement in which axial sliding displacement is operable. Preferably, the external force association member 6 is provided with a spline. Alternatively, the external force association member 6 can be omitted, and an outer spline can be directly processed on the external force member 7.

As shown in FIG. 7, in order that an overload protection effect is achieved during the transmission process, a friction engagement member 18 and a transmission friction member 19 are provided in the external force association member 6 and the first concave-convex assembly 4. Preferably, an engagement construction with a conical friction surface is employed so as to increase transmission capacity.

As shown in FIG. 8, if the coupling device of the present invention is applied to the clutch and brake device, a friction ring surface projecting from the disk 2 can be coupled with the friction block. The friction block 20 is mounted on the retaining member 21. When the retaining member 21 is connected to a relative static object, a brake device is formed; and when the retaining member 21 is connected to a relative movable object, a clutch device is constituted.

As shown in FIG. 9, a friction surface projecting from the coupling disk 1 is coupled with the friction block 20. In order to obtain a uniform gap between the friction surface, a support pin 22 is provided so as to pass through a hole provided on the friction block 20 and be mounted on the retaining member 21. Also, a thin wall sleeve 25 is provided on the first concave-convex assembly 45 so as to achieve a dust-proof effect.

As shown in FIGS. 11-13, in order that the friction member is compensated after it is worn out, the friction surface of the coupling device 1 can be divided into an inner disk body 23 and an outer friction ring 24. Also, a compensation device is provided in the inner disk body 23 and the outer friction ring 24. The compensation device comprises an outer threaded block 27 and a compensation spring 28. Sawtooth type inner threaded ring 26 is provided on the outer friction ring 24. Also, Sawtooth threads are provided on the outer threaded block 27 so as to engage with those of the inner threaded ring 26. When the outer threaded block 27 are formed in rectangle shape, a circumferential limit means and an axial limiting means are provided on the inner disk body 23. Further, when the outer threaded block 27 are formed in circular shape, the outer threaded block 27 are fixed in hole with cylindrical surfaces so as to function as an axial limiting means and a circumferential means.

As shown in FIG. 14, the disk 2 and the first concave-convex assembly 4 fixedly connected or integrally formed. The pull rod 14 passes through long arcuate holes provided on the press spring 3', the disk 2 and the hole of the press plate 31 so as to be mounted to the coupling disk 1.

FIG. 15 shows the assembled state in which FIG. 7 and FIG. 10 are combined together.

As shown in FIG. 16, an adjustment spring 29 and a screw 30 are provided on the retaining member 21. One end of the adjustment spring 29 is associated with the retaining member 21, and the other end of the adjustment spring 29 is associated with the friction block 20. The screw 30 is connected to the retaining member 21, and the other end of the screw is associated with the friction block 20 so as to limit the friction block 20.

As shown in FIG. 17, a left friction ring 32 is provided in the disk 2 and the friction block 20. A hole is provided on the left friction ring 32, and a long arcuate hole is provided on the disk 2. The disk 2 and the second concave-convex assembly 5 are fixedly connected or integrally formed. The pull rod 14 passes through the hole of the disk 2 and then passes through the hole of the friction ring. A left press plate 31 is provided on the left side of the disk 2, and a hole is provided on left press plate 31. The press plate 31 is mounted to the pull rod 14. One end of the spring 3' is pressed against and connected to the press plate 3, and the other end of the spring 3' is connected to the other end of the pull rod 14.

As shown in FIG. 18, the first concave-convex assembly 4 and the disk 2 are integrally formed. An inner support rod "c" is fixed to the disk 2. A right friction ring 35 is provided between the outer friction ring 24 and the friction block 20. The right friction ring 35 is mounted onto an inner support pin 33 through a hole. At this time, the external force member 7 can be used as a driven shaft, and the out-extending shaft 8 can be used as a driving shaft. Thus, a reversed mounting arrangement is achieved.

As shown in FIG. 19, a key pin 36 is provided between the outer friction ring 24 and the right friction ring 35. The key pin 36 engages with a hole of the right friction ring 35 so as to restrict the relative rotation between the outer friction ring 24 and the coupling disk 1.

As shown in FIG. 20, a release member 37 is provided on the left friction ring 32 or integrally formed on the left friction ring 32. The left side of the disk 2 engages with the release member 37, and the left side of the release member 37 is connected to the left friction ring 32. In this case, when the disk 2 moves in the axial direction, the left friction ring 32 is actuated to move in conjunction with movement of the disk 2.

In order to keep the first and second concave-convex assemblies 4, 5 in a release state, restriction is applied to the components connected to the first and second concave-convex assemblies 4, 5 SO as to retrain the first and second concave-convex assemblies 4, 5 from rotating relative to each other. That is, a flexible coupling device can be converted to be a rigid coupling device or a rigid coupling device can be converted to be flexible coupling device. Thus, the brake and clutch device can be shifted from a normally closed state into a normally released state or from a normally released state into a normally closed state.

As shown in FIG. 21, a release-ensuring frame 41 and a confronting member 42 are provided and directly or indirectly connected to the concave or convex assembly 4, 5 respectively. A groove hole is provided on the release-ensuring frame 41, and a threaded hole is provided on the confronting member. When the first concave-convex assembly 4 rotates a predetermined angle relative to the second concave-convex assembly 5, a locking member "a" provided outside of the mechanism can be tightened into the threaded hole through the groove hole. Thus, the relative rotation between the first concave-convex assembly 4 and the second concave-convex assembly 5 is retrained. At this case, the brake and clutch device is rigidly connected, and is kept in a normally released state.

As shown in FIG. 22, a support arm is provided on the release-ensuring frame 41, and an insert rod 38 is hinged to the support arm of the release-ensuring frame 41. A plug of the insert rod 38 can be inserted into a groove of the confronting member 42 through a hole of the release-ensuring frame 41. A centrifugal member 39 is provided on the lever 43 connected to the other end of the insert rod 38. One end of a spring 40 is mounted onto the centrifugal member 39, and the other end of spring 40 is mounted onto the release-ensuring frame 41. In this case, when the device rotates at a low speed or remains static, the centrifugal force applied to the centrifugal member 39 is smaller than spring force exerted by the spring 40 and the insert rod 38 cannot be inserted into the groove. When rotation speed of the centrifugal member 39 increases to be more than a predetermined value, the centrifugal force applied to the centrifugal member 39 is greater than the spring force exerted by the spring 40. As a result, the centrifugal member 39 can be inserted into the groove. Thus, a rigid coupling is achieved so that the brake and clutch device is kept in a normally released state.

As shown in FIG. 23, the centrifugal member 39 is replaced by a centrifugal cap 44. An outer threaded cylinder is provided on the release-ensuring frame 41, and a cap 45 is mounted on the outer threaded cylinder of the release-ensuring frame 41 through inner threads provided thereon. A spring 40 is mounted on the front insert rod 46 and located in the outer threaded cylinder of the release-ensuring frame 41. One end of the spring is associated with the cap 45, and the other end of the spring is associated with a plug of the front insert rod 46. At this time, when the device rotates at low speed or remains static, the front insert rod 46 can be inserted into a groove of the confronting member 42. Contrary to the situation as illustrated in FIG. 22, when rotation speed increases, the front insert rod 46 cannot be inserted into the groove which is contrary to the state shown in the FIG. 22.

As shown in FIG. 24, the front insert rod 46 and the rear insert rod 48 are used in combination with each other, and an association pin 47 is provided on the centrifugal cap 44 so as to be associated with an association elongated hole of the lever 43. When rotation speed is smaller than a critical value, the front insert rod 46 is inserted into a groove. When rotation speed is greater than a critical value, the rear insert rod 48 is inserted into the groove so that relative angular displacement between the first concave-convex assembly 4 and the second concave-convex assembly 5 is restricted. When the rotation speed comes around the critical value, the relative angular displacement between the first concave-convex assembly 4 and the second concave-convex assembly 5 is not restricted.

FIG. 25 shows a brake and clutch device in which the components shown in FIGS. 21-24 are incorporated thereto.

As shown in FIG. 26, in the above brake and clutch device, in order that the rotation inertia is reduced, it is preferable that a spring is mounted on the retaining member 21. As a result, a first and second concave-convex assemblies 4, 5 are directly or indirectly supported on the retaining member 21.

Referring to FIG. 26, the first concave-convex assembly 4 is provided with a ring, and a bearing 52' is provided between the disk 1 and the disk 2. The disk 2 is provided with an outer spline so as to engage with the inner spline of the retaining member 21. One end of the spring 3 is pressed against the disk 2, and the other end of spring 3 is provided with a spring adjustment member 55. The spring adjustment member 55 is mounted on the left side end plate 54, and the left side end plate 54 is mounted on the retaining member 21. The first concave-convex assembly 4 is provided with an inner spline 15, and the left shaft transition member 50 is provided with an outer spline 16. The inner spline 15 and the outer spline 16 engage with each other, and the left shaft transition member 50 is mounted on the left side end plate 54 through a bearing 52'. The bearing 52' is provided with a left shaft end cover 64. An external force association member 6 is provided between the left shaft transition member 50 and the external force member 7. The release screw 67 passes through a circular hole of the left end plate 54 so as to be mounted on the disk 2, and the disk 2 is provided with a friction block 20. The convex member 5 is mounted onto the right end plate 56 through the bearing 52', and the bearing 52' is provided with a right end cover 57. The inner friction ring 53 is provided with an inner spline so as to engage with the outer spline of the right shaft transition member 51. The adjustment member 58 and the tightening screw 59 pass through a circular hole of the right end plate so as to be mounted onto the outer friction ring 60. The right end plate 56 is mounted on the retaining member 21. The second concave-convex assembly 5 is provided with an outer spline so as to engage with the inner spline of the inner friction ring 53. The inner friction ring 53 is associated with the friction block 20 of the disk 2 and the friction disk 20 of the outer friction ring 60, respectively. The second concave-convex assembly 5 is associated with the out-extending shaft 8 through the right shaft transition member 51. When the retaining member 21 is mounted on a relatively movable object, a coupling clutch device for a shaft is formed. When the retaining member 21 is mounted on a relative static object, a coupling brake device for a shaft is formed. When the inner friction ring 53 is not provided, a coupling for a shaft is formed.

Advantages and features of embodiments of the coupling device of the present invention are described as follows:

1. The first and second concave-convex assemblies 4, 5 of the present invention are configured to be a press engagement arrangement in which axial angular displacement relative to each other is operable. The first concave-convex assembly 4 and the disk 2 constitute a coupling assembly with an axial press engagement in which rotational angular displacement relative to each other is operable. An external force association member 6 is provided between the first concave-convex assembly 4 and the external force member 7. The first concave-convex assembly 4 and the external connection member 6 are configured to be a radial press engagement arrangement in which axial displacement relative to each other is operable. The external force member 7 engages with the first concave-convex assembly 4 through the external force association member 6 and is further associated with the coupling disk 1 through the engagement between the first concave-convex assembly 4 and the second concave-convex assembly 5. Thus, the external force member 7 is mounted onto the out-extending shaft 8. Therefore, the construction of the coupling device is simplified, and transmission efficiency is improved. Further, the engagement and release operation of the coupling device can be more reliably and effectively performed.

2. In the coupling brake and clutch device for a shaft of the present invention, a coupling device for a shaft of the present invention is used. As a result, the transmission efficiency of the coupling is enhanced, and more reliable and effective engagement and release operation of the coupling brake and clutch device can be achieved.

3. The gap adjustment and compensation device of the present invention includes a circumferential and an axial limiting means in which an inner disk body 23 is provided with an outer threaded block 27. Thus, the reliability of the compensation device of the coupling brake device is improved.

4. The release-ensuring device of the present invention includes an insert rod 38, a centrifugal member 39, a release-ensuring spring 40 and a release-ensuring frame 41. The release-ensuring source device in the prior art such as an electromagnet is replaced by a linkage mechanism, a front insert rod 46 and a rear insert rod 48. Therefore, the power consumption is reduced. Further, when the external force member is disconnected from the external force generating source under high speed, the brake disk and the friction block do not engage with each other immediately due to operation of the release-ensuring device. Only when rotation speed drops down to a predetermined value, the brake disk and the friction block engages with each other so as to achieve delay braking technical effect. As a result, the control devices of the prior art, such as electrical controllers, are omitted.

5. In the overload protection device of the present invention, a friction engagement member 18 and the friction transmission member 19 are provide between the friction member 7 and the first concave-convex assembly 4. When transmission torsional moment excesses the torsional moment generated by the friction engagement body 18, slip occurs in the friction transmission process so as to achieve an overload protection function.

FIGS. 27-48 show a coupling device for a shaft according to a first embodiment of the present invention. The coupling device of the present invention includes a first concave-convex assembly 4 and a second concave-convex assembly 5, an assembly of splines 15, 16, a disk 2, a coupling disk 1, a retaining member 21, a support pin 22, a friction block 20, an inner friction ring 53, a thin wall sleeve 25, a pull rod 14, a spring 3, an outer friction ring 24, an inner disk body 23, an outer threaded block 27, an inner threaded block 26, a compensation spring 28, a locking member "a", a nut 61, and a key pin 36.

The first concave-convex assembly 4 is provided with a projecting platform surface 67. The projecting platform surface 67 engages with a projecting platform surface 68 of the disk 2 so that an axial press engagement arrangement is constituted in which relative rotational angular displacement between the projecting platform surface 67 and the projecting platform surface 68 is operable. The first concave-convex assembly 4 is provided with an inner spline 15, and the second concave-convex assembly 5 is provided with an outer spline 16. The inner spline 15 and the outer spline 16 is pressed against and engaged with each other such that the inner spline 15 is movable in an axial direction relative to the outer spline 16. A release-ensuring frame 41 extending from the disk 2 is fitted over a cylindrical wall 70 outside of the inner spline 15. A friction ring 71 extending from the disk 2 is associated with the friction block 20. The second concave-convex assembly 5 is mounted on the coupling disk 1, and the coupling disk 1 is connected to the outer friction ring 24 through the outer threaded block 27, the compensation spring 28 and the inner threaded ring 26. The outer friction ring 24 is associated with the right friction ring 35 through the key pin 36. The pull rod 14 passes through a circular hole 72 of the disk 2, a circular hole 75 of the inner friction ring 53 and a circular hole 73 of the right friction ring 35. One end of the pull rod 14 is fixed on the coupling disk 1, and a spring 3 is fitted over the pull rod 14. One end of the spring 3 is pressed against the disk 2, and the other end of the spring 3 is associated with the other end of the pull rod 14 through the nut 61. A locking member "a" engages with a threaded hinge hole of the cylindrical sleeve 70 of the first concave-convex assembly 4 through a hole 74 of the release-ensuring frame extending from the disk 2, and a thin wall sleeve 25 is fitted over the first and second concave-convex assemblies 4, 5. The inner friction ring 53 is fitted over the pull rod 14 through the circular hole 75 provided thereon. The coupling disk 1 can also be mounted on the out-extending shaft 8 through a shaft coupling member 9. When the external force member 7 rotates, moment is transferred to the out-extending shaft 8. Upon operation of the spring 3 and the pull rod 14, the first concave-convex assembly 4 can both rotate relative to the second concave-convex assembly 5 and displace in an axial direction relative to the second concave-convex assembly 5 so that the disk 2 and the outer friction ring 24 disconnect from the friction block 20.

Consequently, The inner spline 15 slides on the outer spline 16 in an axial direction so as to achieve a cushion effect. As a result, a flexible coupling device is achieved. When the external force member 7 loses power source, the disk 2 and the outer friction ring 24 engage with the friction block 20 so as to achieve a braking effect due to operation of the spring 3. As a result, a brake effect can be achieved by the coupling device.

FIG. 28 is a partial view taken directly from FIG. 27 showing the portion for completing the flexible coupling function. As shown in FIG. 28, the disk 2 is not provided with a release-ensuring frame and a friction ring. Also, the coupling disk 1 is not provided with an outer friction ring, and the parts for braking clutch and those for release-ensuring function are omitted.

Next, the specific construction of the coupling will be described as follows. A protruding platform surface 67 of the first concave-convex assembly 4 slides on a protruding platform surface 68 of disk 2 while the protruding platform surface 67 of the first concave-convex assembly 4 rotates relative to the protruding platform surface 68 of disk 2 with angular displacement. Further, a protruding platform surface 67 of the first concave-convex assembly 4 is pressed against the protruding platform surface 68 of disk 2 in an axial direction. The second concave-convex assembly 5 is mounted on the coupling disk 1, and the pull rod 14 passes through a circular hole 72 of the disk 2. One end of the pull rod 14 is mounted on the coupling disk 1, and the spring 3 is fitted over the pull rod 14. One end of the spring is pressed against the disk 2, and the other end is associated with the other end of the pull rod 14 through the adjustment nut 61. Further, a thin wall sleeve 25 is fitted over the first concave-convex assembly 4, 5.

FIG. 29 is an exploded view showing the first and the second concave-convex assemblies 4, 5 of FIG. 27 and FIG. 28. As shown in FIG. 29, the engaging surfaces of the first and second concave-convex assemblies 4, 5 are configured to be in the shape of right helicoids. Further, three engagement arrangements having leads in both left and right direction for engagement and release along the left-hand screw direction and right-hand screw direction are provided. Alternatively, two engagement arrangements or four engagement arrangements or the like can be provided. Each of the above engagement arrangements of the first and second concave-convex assemblies 4 and 5 are identical to each other and have the same lead angle. The engagement arrangements of the first concave-convex assembly 4 correspond to those of the second concave-convex assembly 5. Alternatively, an engagement arrangement having lead in only one direction may be provided.

FIG. 30 is a cross-sectional view of the inner and outer spline of FIGS. 27 and 28.

FIG. 31 is a partial view showing a modified coupling device according to the first embodiment of the present invention. As shown in FIG. 31, a conical friction member 18 is provided in the concave-convex member and the external force association member 6. One end of the conical friction member 18 is connected to the external force member 6, and the other end of the conical friction member 18 is associated with a conical surface 76 of the first concave-convex assembly 4. Further, a conical friction transmission member 19 is provided between the conical friction member 18 and the first concave-convex assembly 4. A platform surface 77 protruding from the external force association member 6 is pressed against and engaged with a platform surface 68 of the disk 2.

FIG. 32 is a partial view showing a modified disk 2 of the coupling device of the first embodiment of the present invention illustrated in FIG. 28. As shown in FIG. 32, a thin wall sleeve 69 which is integrally formed with the disk 2 and projects from the disk 2 is provided. Thus, the length of the pull rod 14 is shortened, and the size of the space is reduced.

FIG. 33 is a schematic view showing another alternative arrangement of a portion of the coupling device according to the first embodiment of the present invention, which is a combination of the structure shown in FIG. 24 and FIG. 31. As shown in FIG. 33, the front insert rod 46 or the rear insert rod 48 are used in combination with each other, an association pin 47 is provided on the centrifugal cap 44 so as to be associated with an association elongated hole of the lever 43. When rotation speed is smaller than a critical value, the front insert rod 46 is inserted into a groove. When rotation speed is greater than a critical value, the rear insert rod 48 is inserted into the groove so that relative angular displacement between the first concave-convex assembly 4 and the second concave-convex assembly 5 is restricted. When the rotation speed comes around the critical value, the relative angular displacement between the first concave-convex assembly 4 and the second concave-convex assembly 5 is not restricted. Further, a conical friction member 18 is provided in the concave-convex member and the external force association member 6. One end of the conical friction member 18 is connected to the external force member 6, and the other end of the conical friction member 18 is associated with a conical surface 76 of the first concave-convex assembly 4. Further, a conical friction transmission member 19 is provided between the conical friction member 18 and the first concave-convex assembly 4. A platform surface 77 protruding from the external force association member 6 is pressed against and engaged with a platform surface 68 of the disk 2.

FIGS. 34-39 are schematic views showing construction of the compensation device of FIG. 27 according to the first embodiment of the present invention. The coupling disk 1 is divided into an inner disk body 23 and the outer friction ring 24. A cylindrical hole 78 is provided on the circumference of the inner disk body 23. The cylindrical surface 79 of the cylindrical hole 78 is used as limiting means in circumferential and axial directions. The outer threaded block 27 is configured to be in a cylindrical shape and is inserted inside the cylindrical hole 78. One end of the compensation spring 28 is associated with the outer threaded block 27, and the other end of the compensation spring 28 is associated with the inner disk body 23. Sawtooth threaded ring 26 are provided on the outer friction ring 24, and outer threads of the outer threaded block 27 is configured to be sawtooth threads so as to engage with the inner threaded ring 26. Alternatively, the inner disk body 23 can be modified so that a groove 80 is provided on the outer circumference of the inner disk body 23, as shown in FIG. 37. As shown in FIGS. 38 and 39, ribs 68 are embedded in a direction perpendicular to the groove 80 so as to function as axial limiting means. The outer threaded block 27 is configured to be in a rectangular shape and is mounted inside a rectangular hole defined by the ribs 68 and the groove 80. One end of the compensation spring 28 is associated with the outer threaded block 27, and the other end of the compensation spring 28 is associated with a bottom surface of the groove 80. Also, the inner threaded ring 26 and the outer threaded block 27 are provided with sawtooth threads and engage with each other. Alternatively, the inner disk body 23 and the outer friction ring 24 are associated with each other through outer threaded block 27. The outer threaded block 27 may be divided into a plurality of groups in which each group is divided into a plurality of blocks. The location of the threaded section of the outer threaded block 27 corresponds to the position where the inner threaded ring 26 is mounted so that the sawteeth of each group of the compensation blocks optimally engages with the sawteeth of the outer threaded block 27.

FIGS. 40-41 are partial views showing an assembled state in which the retaining member 21, the friction block 20 and the support pin 22 are assembled together. The friction member 22 is divided into two pieces and each piece is provided with a circular hole 82 and an elongated hole 83. The retaining member 21 is configured to be a circular loop and is provided with four support pins 22. The upper support pin 22 is inserted into the circular hole 82 of the friction block 20, and the lower support pin 22 is inserted into the elongated hole 83. With engagement between the circular hole 82, the elongated hole 83 and the support pin 22, when the coupling device is brought into a brake or a release state, the friction block 20 slides on the support pin 22.

FIG. 42 is a schematic view of an arrangement according to the first embodiment of the present invention in which the retaining member 21, the friction block 20 and the support pin 22 of FIG. 27 are modified. The retaining member 21 is provided with an inner spline 84', and the friction block 20 is provided with an outer spline 84. The inner spline 84' engages with the outer spline 84. When the coupling device is brought into a brake state, the friction block 20 slides on the support pin 22.

FIG. 43 shows a modified example of FIG. 42. As shown in FIG. 43, the retaining member 21 is provided with a spring 29 and an adjustment screw 30. One side of the friction block 20 is associated with the adjustment spring 29, and the other side of the friction block 20 is associated with the adjustment screw 30.

FIG. 44 shows a modified example of the release-ensuring device of FIG. 27 according to the first embodiment of the present invention. As shown in FIG. 44, the release-ensuring frame 41 is provided with an outer threaded sleeve 86, and the front insert rod 46 is mounted inside the outer threaded sleeve 86. One end of the release-ensuring spring 40 is associated with a plug 85 of the front insert rod 46, and the other end of the release-ensuring spring 40 is associated with the cap 45. The front insert rod 46 passes through a hole of the cap 45 so as to engage with a centrifugal cap 44. Inner threads of the cap 45 engage with outer threads of the outer threaded sleeve 86, and a front groove 87 engages with the plug of the front insert rod 46. Alternatively, the cap 45 may be provided with outer threads, and inner threads are provided on the centrifugal cap 44 so as to engage with each other. Thus, a manual release-ensuring device is achieved.

FIGS. 45-46 show another modified example of the release-ensuring device of FIG. 27 according to the first embodiment of the present invention. As shown in FIGS. 45-46, an outer threaded sleeve 86 and a support rod 88 are provided on the release-ensuring frame 41. An upper hinge hole 89 and a lower hinge hole 90 are provided on the support rod 88, and the centrifugal cap 44 is provided with an association pin 47. The lever 43 is provided with an elongated hole 91 at a left end thereof so as to associate with the association pin 47. The lever 43 is provided with a left hinge hole 92 and a right hinge hole 93, and the rear insert rod 48 is provided with a lower hinge hole 94 and a lower hinge hole 95. A connection rod 49 is provided with a static hinge hole 96 and a movable hinge hole 97. The support rod 88, the lever 43, the rear insert rod 48 and the connection rod 49 are connected by four pins so as to form a four linkage mechanism. The front insert rod 46 is mounted inside the outer threaded sleeve 86 of the release-ensuring frame 41. One end of the release-ensuring spring 40 is associated with the plug 85 of the front insert rod 46, and the other end of the release-ensuring spring 40 is associated with the cap 45. The inner threads of the cap 45 are engaged and connected with the outer threads of the outer threaded sleeve 86. The front insert rod 46 passes through a hole of the cap 45 so as to be associated with the centrifugal cap 44. The front groove 87 and the rear groove 98 engage with the front insert rod 46 and the rear insert rod 48, respectively. When the rotation speed is more than or less than a critical value, the coupling device is kept in a released state. Also, the front insert rod can be replaced by an insert rod without a head portion in lieu of the front insert rod. At this time, the coupling device is used only as a release-ensuring device.

FIG. 47 shows a modified example of FIG. 27 according to the first embodiment of the present invention in which the inner friction ring 53 is replaced by a limiting pin 34 so that axial displacement is limited. The limiting pin 34 passes through the circular hole 72 of the disk 2, and the hole 75 of the inner friction ring 53 is mounted on the coupling disk 1. The other end of the limiting pin 34 is formed with a step portion 99 so as to engage with the end face with circular holes so that distance of axial displacement is limited.

FIG. 48 shows a modified example of the inner friction ring 53 of FIG. 27 according to the first embodiment of the present invention. A support pin 33 is provided, and the inner friction ring 53 is connected to the first concave-convex assembly 4 through the support pin 33. The support pin 33 passes through a circular hole 75 of the inner friction ring 53 and is mounted on a friction disk 101 extending from the first concave-convex assembly 4. The friction disk 101 is associated with the friction block 20.

FIGS. 49-53 show a second embodiment of the present invention. FIG. 49 shows an assembled state of the coupling device of the present invention. The first concave-convex assembly 4 is configured to be a projecting ring 103, and a bearing 52 is provided between the projecting ring 103 and the disk 2. An outer spline 104 is provided on the disk 2 so as to engage with the inner spline 105 of the retaining member 21. One end of the spring 3 is mounted on the disk 2, and the other end of the spring is mounted on the adjustment plate 62. Threads of the release screw 67 is connected with the adjustment plate 62, and the platform surface with larger head portion is pressed against and engaged with the left end plate 54. The smaller rectangular column of the spring force adjustment member 55 passes through a hole 108 of the left end plate 54. The end plate 54 is mounted on the retaining member 21, and the concave-convex member 4 is provided with an inner spline 15.

The left shaft transition member 50 is mounted on the left end plate 54 through the bearing 52, and the bearing 52 is provided with a left end cover 64 and an oil seal 63. The left shaft transition member 50 is provided with an outer spline 16 so as to engage with the inner spline 15 of the first concave-convex assembly 4. The release screw 67 passes through the circular hole 109 of the left end plate 54. The second concave-convex assembly 5 is provided with a right end transition member 51 which is mounted on the right end plate 56. The bearing is provided with a right end cover 57 and an oil seal.

The outer friction ring 60 is provided with an outer spline 110 so as to engage with an inner spline 105 of the retaining member 21. The tightening screw member 59 passes through a hole of the right end plate 56 so as to be mounted on the outer friction ring 60. A screw of the gap adjustment member 58 is mounted on the outer friction ring 60, and a column with a smaller rectangular head portion of the gap adjustment member 58 passes through a hole of the right end plate 56. The right end plate 56 is mounted on the retaining member 21. The second concave-convex assembly 5 is provided with a right shaft transition member 51 and an outer spline 114 so as to engage with the inner spline 105 of the inner friction ring 53. The inner friction ring 53 is associated with the disk 2 and the outer friction ring 60. When the retaining member 21 is mounted on a relative movable object, a coupling clutch device for a shaft is achieved. When the retaining member 21 is mounted on a relative static object, a coupling brake device for a shaft is achieved.

FIG. 50 shows a modified example of the second embodiment of the present invention. Two ends of the retaining member 21 are mounted on an input machine such as a motor and an output machine such as a reduction machine, respectively. The left end plate 54 is used as an end cover of the input machine. A bearing 52' is used as a support for a shaft member of the input machine. The left shaft transition member 50 is replaced by a shaft of an input machine, and the shaft is provided with an outer spline 16 so as to engage with an inner spline 15 of the first concave-convex assembly 4. Alternatively, the left shaft transition member 50 is modified so as to be mounted on the shaft of the input machine. The right end plate 56 is used as an end cover of the output machine, and the bearing 52' is used as a support bearing of a shaft of the output machine. The concave-convex assembly is mounted on a shaft for an output machine.

FIG. 51 shows a modified example of a second embodiment of the present invention. The retaining member 21 is separately mounted on an input machine. The spring force adjustment member 55 is provided on the right end plate 56. The left end plate 54 is the same as that shown in FIG. 50. The construction of the left end plate 54 and the concave-convex assembly is identical to those shown in FIG. 49.

FIG. 52 shows a modified example of the second embodiment of the present invention. The retaining member 21 is separately mounted on the output machine, and the release screw 67 is provided on the left end plate 54. The construction of the right end plate 56 and the second concave-convex assembly 5 is identical to those of FIG. 49.

FIG. 53 shows a modified example of the second embodiment of the present invention. A damping member 65 is provided between an adjustment plate 62 and the disk 2. Two ends of the damp member 65 are connected to the adjustment plate 62 and the disk 2. When the disk 2 and the inner friction ring 53 disconnect from each other, no damp or little damp is applied by the damp member 65. When the disk 2 and the adjustment plate 62 engage with each other, damp or large damp is applied by the damp member 65. The damp member employs a damp delay oil cylinder so that a delay effect can be achieved by use of oil resistance generated by both negative pressure means and positive pressure means. When only one of the negative pressure damping means and the positive pressure damping means is employed, a negative pressure means is preferably used for achieving delay effect.

FIG. 54 shows a modified example of the second embodiment of the present invention in which a damp oil cylinder 66 is provided. Two ends of the oil cylinder 66 are mounted on the adjustment plate 62 and the disk 2, respectively. Two ends of a piston of the oil cylinder 66 are provided with oil chambers D,E. When the disk 2 and the inner friction ring 53 disconnect from each other, oil from D oil cylinder enters rapidly into E chamber so that no damp or little damp is applied. Thus, no pressure is applied on the cylinder 66. When disk 2 engages with the inner friction ring 53, oil of the E chamber enters into the D chamber slowly, and delay due to large damp is generated. Positive pressure is applied on oil in the E chamber of the oil cylinder 66, and negative pressure is applied on oil in the D chamber of the oil cylinder 66. As a result, time delay due to large damp is generated. Oil lines are preferably provided inside the piston of the cylinder, and oil can be introduced into the oil chambers through the piston rod and a bottom plate of the cylinder.

The gap adjustment and compensation device for a shaft can also be applied to other devices such as a pipe joint, a column joint and an anchor joint in which tightening effect can be adjusted and can be lessened after rust occurs in the joint.

The release-ensuring device of the present invention can be applied to a mechanical device such as rotating vanes of a fan or a pump in which two rotating objects of a rotatable body displace relative to each other and dynamic transition control is necessary.

Compared with the prior art, embodiments of the present invention have notable substantial features in that no additional force generating source and no controller sources are needed. Combinations can be employed so as to meet different requirements of new apparatuses for a shaft under different conditions. The present invention has advantages of saving energy, operation reliability and can be applied in a wide range of technical fields. Embodiments of the present invention can be widely used in transport engineering projects, such as mining, metallurgy, heavy lifting and construction.

Although several preferred embodiments have been shown and described with reference to the drawings, it would be appreciated by those skilled in the art that changes may be made in these embodiments without departing from the principles and spirit of the invention, the scope of which is defined in the claims and their equivalents.

What is claimed is:
1. A coupling device for a shaft, comprising:
a coupling disk coupled to an out-extending shaft;
a disk coupled to an external force member;
a first concave-convex assembly which is with the disk and has a first helicoid engaging surface;
a second concave-convex assembly which is engaged with the coupling disk and has a second helicoid engaging surface engaged with the first helicoid engaging surface; and
a force generating source member provided between the coupling disk and the disk, wherein:
the first and second concave-convex assemblies are positioned to be pressed against and engaged with each other, and wherein at least one of the first and second concave-convex assemblies is movable relative to the other to effect a rotational angular displacement and an axial displacement relative to the other;
the first concave-convex assembly and the disk are positioned to be pressed against and engaged with each other, with at least one of the first concave-convex assembly and the disk being movable relative to the other to effect a rotational sliding angular displacement between the first concave-convex assembly and the disk;

an external force association member is positioned between the first concave-convex assembly and said external force member, and the external force association member and the first concave-convex assembly are positioned to be pressed against and engaged with each other in a radial direction, and wherein at least one of the external force association member and the first concave-convex assembly is movable relative to the other to effect an axial sliding displacement between the external force association member and the first concave-convex assembly; and upon action of the force generating source member, the disk is coupled with the out-extending shaft via the coupling disk so that the external force member and the out-extending shaft are coupled.

2. The coupling device of claim 1, further comprising:
a friction block provided between the coupling disk and the disk; and
a retaining member which is coupled with said friction block, wherein:
friction surfaces respectively extending from the coupling disk and the disk are engageable with the friction block.

3. The coupling device of claim 2, wherein:
the friction surfaces include an inner disk body and an outer friction ring, wherein:
the inner disk body and the outer friction ring are provided therein with an outer threaded block, a compensation spring and a key pin.

4. The coupling device of claim 3, wherein:
the outer friction ring engages with a further friction ring via the key pin.

5. The coupling of claim 2 wherein:
the first and second concave-convex assemblies are supported on a left end plate and a right end plate of the retaining member through bearings, respectively.

6. The coupling device of claim 5, wherein:
the second concave-convex assembly is provided with an inner brake ring.

7. The coupling device of claim 2, wherein:
the retaining member is movable so as to achieve a coupling clutch function.

8. The coupling device of claim 2, wherein:
the retaining member is static so as to achieve a coupling brake function.

9. The coupling device of claim 1, wherein:
the first and second concave-convex assemblies are provided with an insert rod and insert slot which correspond to each other so as to be locked with each other, and the insert rod is mounted inside an outer threaded sleeve of a release-ensuring frame;
one end of a release-ensuring spring is connected with a plug of the insert rod, and the other end of the release-ensuring spring is connected with a cap;
inner threads of the cap are connected with the outer threaded sleeve, and the insert rod passes through a hole of the cap so as to be connected with a centrifugal cap.

10. The coupling device of claim 1, wherein:
the coupling disk is coupled to the out-extending shaft through a shaft coupling member.

11. The coupling device of claim 1, wherein:
the first concave-convex assembly and the external force association member are positioned to be engaged with each other via an outer spline and an inner spline.

12. The coupling device of claim 11, wherein:
the first concave-convex assembly is coupled to the inner spline and the second concave-convex assembly is coupled to the outer spline.

13. The coupling device of claim 1, wherein:
the force generating source member comprises a press spring.

14. The coupling device of claim 13, wherein:
a pull rod is mounted on the coupling disk and passes through a circular hole of the disk so as to be coupled to the disk.

15. The coupling device of claim 14, wherein:
the press spring is fitted over the pull rod, wherein:
one end of the press spring is pressed against and mounted on the disk, and the other end of the press spring is mounted on the pull rod.

16. The coupling device of claim 1, wherein:
a friction member is provided between the first concave-convex assembly and the external force association member; and
the friction member is engageable with the first concave-convex assembly and the external force association member, respectively.

17. The coupling device of claim 16, wherein:
the friction transmission member is provided between the first concave-convex assembly and said friction member; and
the friction transmission member engages with the first concave-convex assembly and the friction member respectively.

18. The coupling device of claim 1, wherein:
the disk includes a release-ensuring frame projecting from therefrom;
the first concave-convex assembly includes a cylindrical sleeve; and
a locking member is fixedly engaged with the release-ensuring frame and the cylindrical sleeve so that relative rotational movement between the first and second concave-convex assemblies is locked.

19. The coupling device of claim 1, wherein:
a pull rod is mounted on the coupling disk and passes through a circular hole of the disk so as to be coupled to the disk.

* * * * *

UNITED STATES PATENT AND TRADEMARK OFFICE
CERTIFICATE OF CORRECTION

| | |
|---|---|
| PATENT NO. | : 7,320,392 B2 |
| APPLICATION NO. | : 10/535022 |
| DATED | : January 22, 2008 |
| INVENTOR(S) | : Xie |

It is certified that error appears in the above-identified patent and that said Letters Patent is hereby corrected as shown below:

On the Title page, in field (54), delete "UNIT" and insert -- "DEVICE" --, therefor.

On the Title page, in field (56), under "Other Publications", in column 2, line 7, after "6,588,552" delete "B2" and insert -- A1 --, therefor.

On the Title page, in field (54), under "Abstract", in column 2, line 4, before "to" insert -- (5) --.

On the Title page, in field (54), under "Abstract", in column 2, line 13, delete "(3joined" and insert -- (3) is joined --, therefor.

On the Title page, in field (54), under "Abstract", in column 2, line 15, delete "t" and insert -- the --, therefor.

On the Title page, in field (54), under "Abstract", in column 2, line 17, delete "at" and insert -- attached to --, therefor.

Drawings

On Sheet 7 of 20 (Right Hand Side), in Fig. 26, line 5, delete "52" and insert -- 52' --, therefor.

On Sheet 10 of 20 (Left Hand Side) in Fig. 31, line 5, delete "3" and insert -- 3' --, therefor.

UNITED STATES PATENT AND TRADEMARK OFFICE
CERTIFICATE OF CORRECTION

PATENT NO. : 7,320,392 B2
APPLICATION NO. : 10/535022
DATED : January 22, 2008
INVENTOR(S) : Xie It is certified that error appears in the above-identified patent and that said Letters Patent is hereby corrected as shown below:

In column 1, line 1, delete "UNIT" and insert -- "DEVICE" --, therefor.

In column 15, line 35, delete "SO" and insert -- so --, therefor.

In column 24, line 50, in Claim 1, after "is" insert -- engaged --.

In column 25, line 35, in Claim 5, after "2" insert -- , --.

Signed and Sealed this

Fifteenth Day of July, 2008

JON W. DUDAS
*Director of the United States Patent and Trademark Office*